(12) United States Patent
Ishikawa et al.

(10) Patent No.: US 7,969,976 B2
(45) Date of Patent: Jun. 28, 2011

(54) GATEWAY APPARATUS, PACKET FORWARDING METHOD, AND PROGRAM

(75) Inventors: Yuichi Ishikawa, Tokyo (JP); Ichiro Yamaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 256 days.

(21) Appl. No.: 12/337,983

(22) Filed: Dec. 18, 2008

(65) Prior Publication Data

US 2009/0161680 A1 Jun. 25, 2009

(30) Foreign Application Priority Data

Dec. 21, 2007 (JP) ................ 2007-329803

(51) Int. Cl.
*H04L 12/28* (2006.01)
*H04J 3/16* (2006.01)
*H04J 3/24* (2006.01)
(52) U.S. Cl. ......... 370/389; 370/466; 370/401; 370/473
(58) Field of Classification Search ........................ None
See application file for complete search history.

(56) References Cited

U.S. PATENT DOCUMENTS

| | | | | |
|---|---|---|---|---|
| 7,391,768 | B1 * | 6/2008 | Samprathi et al. ............ | 370/389 |
| 2004/0006643 | A1 * | 1/2004 | Dolson et al. ................. | 709/246 |
| 2006/0104288 | A1 * | 5/2006 | Yim et al. ................. | 370/395.52 |
| 2007/0201474 | A1 * | 8/2007 | Isobe ............................ | 370/392 |

FOREIGN PATENT DOCUMENTS

| | | |
|---|---|---|
| JP | 2002-261792 | 9/2002 |
| JP | 2004-30309 | 1/2004 |
| JP | 2007-157085 | 6/2007 |

* cited by examiner

*Primary Examiner* — Pankaj Kumar
*Assistant Examiner* — Hicham B Foud
(74) *Attorney, Agent, or Firm* — Young & Thompson

(57) ABSTRACT

The present invention provides a gateway apparatus and a packet forwarding method for rewriting the application header of a forwarded packet without terminating a TCP connection between a client and a server. For that purpose, the gateway apparatus in accordance with the present invention uses the conversion section 116 of the gateway module 110 to register, in a conversion table 117, a pair of a sequence number (Seq#) which is expected to be contained in the TCP header of a next packet to forward and a Seq# after conversion which is obtained by considering a change in packet size due to application (AP) header rewriting as a pair of an expected Seq# and a conversion Seq# as well as a pair of an expected Ack# and a conversion Ack# contained in the TCP header of a packet in a direction opposite to that of the previously forwarded packet at the time of forwarding. Then, the conversion section 116 refers to the conversion table 117 at next packet forwarding to rewrite the Seq# and the Ack# contained in the TCP header of a packet to forward to the conversion Seq# and conversion Ack# corresponding to the expected Seq# and expected Ack# matching these numbers.

33 Claims, 13 Drawing Sheets

FIG. 5

CLIENT TO SERVER SEQ / ACK# CONVERSION TABLE 117-1

CLIENT TO SERVER SEQ# CONVERSION TABLE 117-11

| CONNECTION ID | CLIENT TO SERVER EXPECTED SEQ# | CLIENT TO SERVER CONVERSION SEQ# |
|---|---|---|
| ... | ... | ... |
| 1 | xxx | yyy |
| ... | ... | ... |

CLIENT TO SERVER ACK# CONVERSION TABLE 117-12

| CONNECTION ID | CLIENT TO SERVER EXPECTED ACK# | CLIENT TO SERVER CONVERSION ACK# |
|---|---|---|
| ... | ... | ... |
| 1 | www | zzz |
| ... | ... | ... |

FIG. 6

SERVER TO CLIENT SEQ / ACK# CONVERSION TABLE 117-2

SERVER TO CLIENT SEQ# CONVERSION TABLE 117-21

| CONNECTION ID | SERVER TO CLIENT EXPECTED SEQ# | SERVER TO CLIENT CONVERSION SEQ# |
|---|---|---|
| ... | ... | ... |
| 1 | zzz | www |
| ... | ... | ... |

SERVER TO CLIENT ACK# CONVERSION TABLE 117-22

| CONNECTION ID | SERVER TO CLIENT EXPECTED ACK# | SERVER TO CLIENT CONVERSION ACK# |
|---|---|---|
| ... | ... | ... |
| 1 | yyy | xxx |
| ... | ... | ... |

FIG. 7
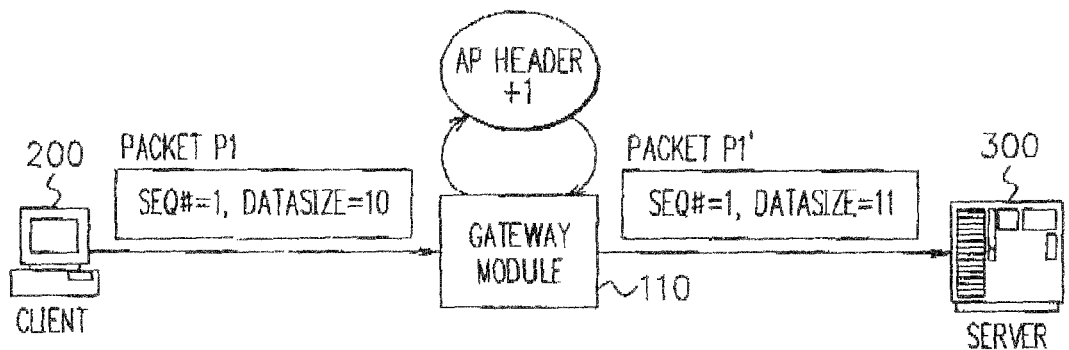
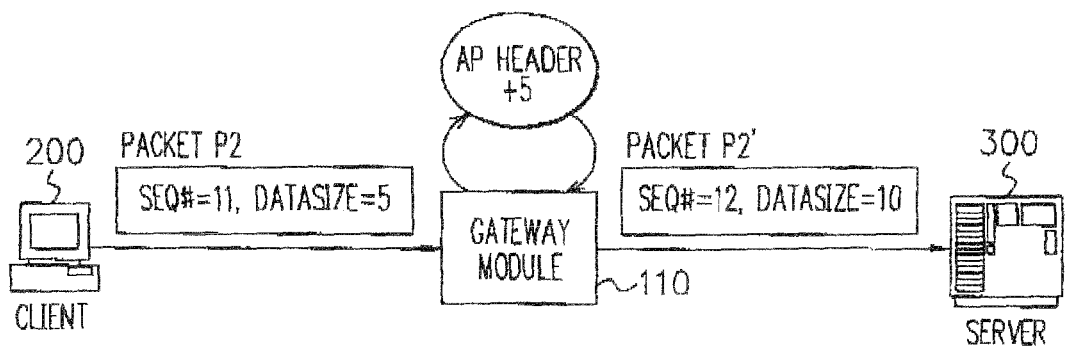
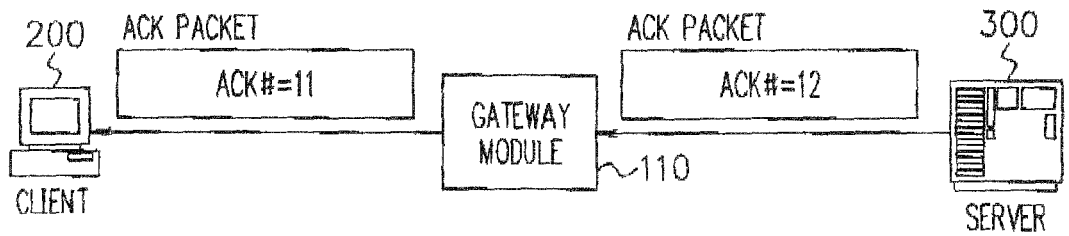

CLIENT TO SERVER REWRITING POSITION MANAGEMENT TABLE

| CONNECTION ID | SEQ# | REWRITING POSITION |
|---|---|---|
| 1 | a | $\alpha, \beta, \gamma$ |
| ... | ... | ... |

SERVER TO CLIENT REWRITING POSITION MANAGEMENT TABLE

| CONNECTION ID | SEQ# | REWRITING POSITION |
|---|---|---|
| 1 | b | $\delta, \epsilon, \zeta$ |
| ... | ... | ... |

F I G. 8-3
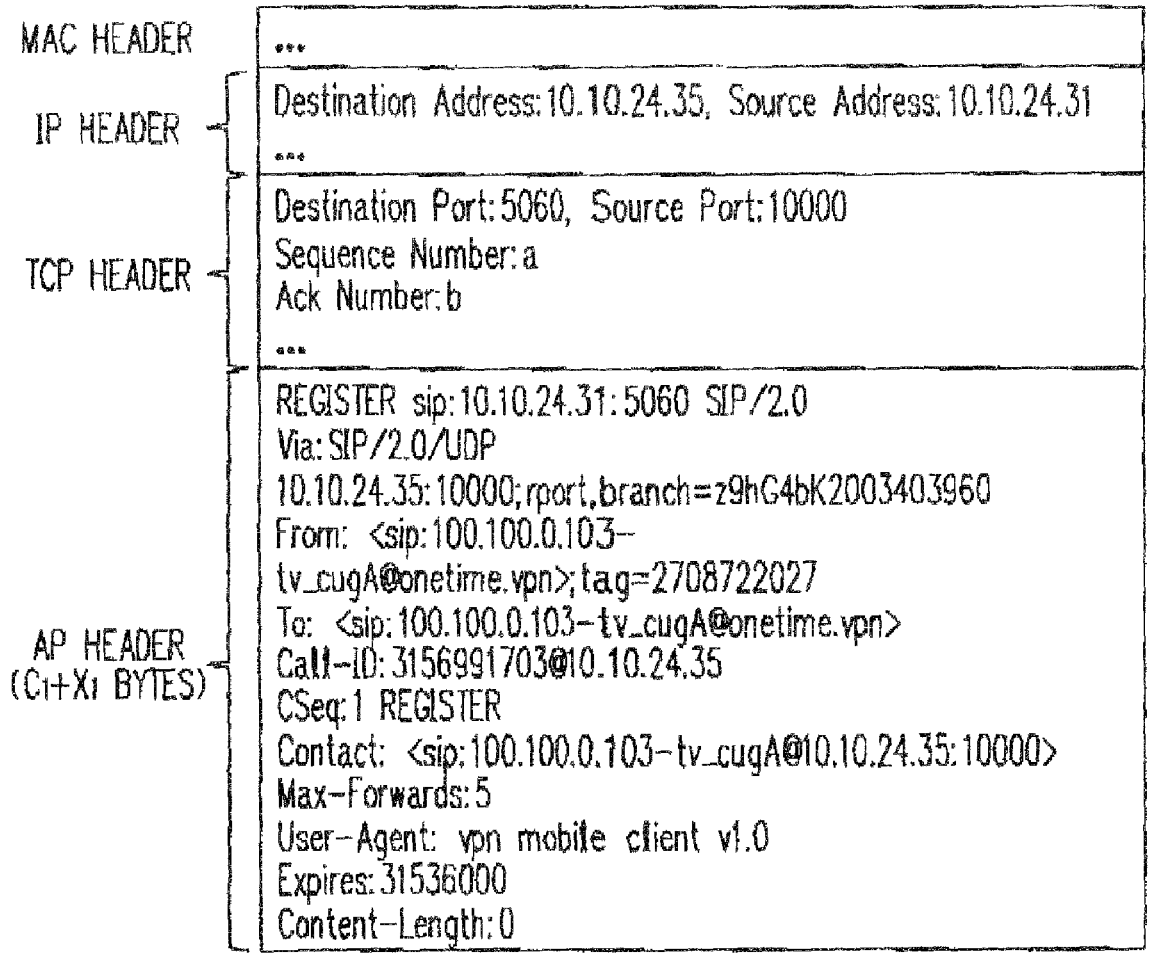

FIG. 12

GATEWAY APPARATUS, PACKET FORWARDING METHOD, AND PROGRAM

This application is based upon and claims the benefit of priority from Japanese patent application No. 2007-329803, filed on Dec. 21, 2007, the disclosure of which is incorporated herein in its entirety by reference.

BACKGROUND OF THE INVENTION

1. Field of the Invention

The present invention relates to a gateway apparatus, a packet forwarding method, and a program for rewriting and forwarding data in a packet flowing on a TIP connection between terminals.

2. Description of Related At

A mechanism for rewriting an application header (hereinafter referred to as an AP header) is widely used in a gateway for forwarding a message sent and received between a client and a server.

For example, according to the SIP, when a client connected to a private network sends a message to a server provided in a global network, an AP header is rewritten in the gateway. According to the SIP, the IP address of the client is contained in the AP header of a message to be sent by the client, and the server sends the message to the client using the IP address as the destination address. If the IP address contained in the message sent to the server by the client remains the private address as is, the message transmission fails. Therefore, as described above, the gateway converts the IP address contained in the AP header of the message sent by the client to the global address.

Alternatively, in order to achieve the use of the multi-tenant server (a use mode of securely sharing a single server among a plurality of client groups (tenant) as if the server is the tenant-dedicated server), the gateway may rewrite the AP header of a message.

For example, the Japanese Patent Laid Open Publication No. 2004-30309 discloses a method for a gateway to perform AP header rewriting to allow a multi-tenant to use a Web cache server when the gateway forwards a message. The gateway forcibly inserts the identifier of a tenant to which the client belongs into a destination URL contained in the AP header of an HTTP message which the client sends to the Web cache server. By doing so, a cache is accumulated in the Web cache server by the URI with the tenant identifier, as well as cache access is performed by the URI with the tenant identifier. Accordingly, the cache can be viewed only by the clients belonging to the same tenant, and thereby a single Web cache server can be securely shared among a plurality of tenants.

Moreover, the Japanese Patent Laid Open Publication No. 2007-157085 discloses a method for a gateway to perform AP header rewriting to allow a multi-tenant to use a SIP server when the gateway transfers a message. The gateway forcibly inserts the identifier of a tenant to which the client belongs into the source URI and the destination URI contained in the AP header of the SIP message which the client sends to the SIP server. By doing so, client information is accumulated in the SIP server by the URI with the tenant identifier, as well as client information access is performed by the URI with the tenant identifier. Accordingly, the client information can be viewed only by the clients in the same tenant, and thereby a single SIP server can be securely shared among a plurality of tenants.

As described above, when a message is sent and received between the client and the server, the gateway may rewrite the AP header of the message before transfer. If the packet size is changed due to the AP header rewriting, the size of a packet at the time when the client or the server sent the packet may differ from the size of the packet at the time when the server or the client received the packet. For this reason, if TCP is used as a protocol of the transport layer and the gateway transfers a packet to the server or the client as is without rewriting the sequence number (hereinafter referred to as Seq#) and the acknowledgement number (hereinafter referred to as Ack#) of a packet received from the client or the server, the server and the client cannot properly know packet loss from the Seq# and the Ack#. Therefore, if the packet size is changed due to the AP header rewriting, the gateway performs the termination process of the TCP connection.

On the contrary, if the gateway does not rewrite the AP header, or the packet size is not changed due to the AP header rewriting, the gateway does not perform the termination process of the TCP connection so as to be relieved from the processing load thereof. An example of such a technique is disclosed in the Japanese Patent No. 3642305. According to the technique disclosed therein, an exchange is provided as a switching device between the client and the server, and a TCP connection established between the client and the exchange and a TCP connection established between the exchange and the server are unified into one connection. Then, each of the client and the server performs packet retransmission and flow control by the TCP, eliminating the need for the exchange to perform retransmission control and flow control about the TCP connection. More specifically, assuming that an initial Seq# of the client is SC and an initial Seq# of the exchange is SU at the time when a TCP connection is established between the client and the exchange; and an initial Seq# of the server is SS and an initial Seq# of the exchange is SV at the time when a TCP connection is established between the server and the exchange, the Seq/Ack# is rewritten as follows. First, the Seq# of the packet sent from the server to the client is rewritten to "Seq#+SU−SS in the packet", and the Ack# is rewritten to "Ack#+SC−SV in the packet". In addition, the Seq# of the packet sent from the client to the server is rewritten to "Seq#+SV−SC in the packet", and the Ack# is rewritten to "Ack#+S−SU in the packet".

SUMMARY

As described above, conventionally, when the packet size is changed due to AP header rewriting, the gateway performs the termination process of the TCP connection. For this reason, the gateway takes the load due to the termination process of the TCP connection. More specifically, the gateway mainly takes the load due to the following processes.

(A) Retransmission Control (1) Processing load for confirming that the forwarded packet reached the client (or the server) by checking the Ack# returned from the client (or the server) and performing packet retransmission when packet loss occurs.

(2) Processing load for buffering a packet received from the server (or the client) until Ack# is received from the client (or the server) in case of packet loss.

(B) Flow Control (1) Processing load for adjusting the number of packets which can be forwarded at once without receiving Ack from the client or the server according to the network congestion state (packet loss) so as not to deteriorate the congestion which occurs in the network.

(2) Processing load for calculating the number of packets which can be received according to the number of its own available packet buffers, and notifying the client or the server.

(C) Copying a Packet Between the Userland and the Kernel Land

The above processes (A) and (B) are performed in a TCP stack operating in the kernel land; while the AP header rewriting is performed by a program which operated in the userland and uses the TCP socket from the TCP stack to receive and process data contained in the packet in a stream format. Therefore, data is frequently copied between the userland and the kernel land, thus generating a processing load.

In view of the above circumstances, the present invention has been made, and an object of the present invention is to provide a gateway apparatus, a packet forwarding method, and a program capable of rewriting the AP header of a forwarded packet without terminating a TCP connection between terminals such as between a client and a server, and thereby eliminate load due to the above described processes (A) to (C) and improve message forwarding capability between terminals.

In order to achieve the above exemplary object, the present invention provides the following features.

<Gateway Apparatus>

The gateway apparatus according to an exemplary aspect of the present invention is a gateway apparatus for rewriting and forwarding an AP header, namely, data following a TCP header of a packet flowing over a TCP connection between terminals, and includes: a number conversion table including an entry for registering a pair of a sequence number which is expected to be contained in the TCP header of a next packet to forward and a sequence number after conversion which is obtained by considering a change in packet size due to AP header rewriting as a pair of an expected sequence number and a conversion sequence number as well as a pair of an expected Ack number and a conversion Ack number contained in the TCP header of a packet in a direction opposite to that of the previously forwarded packet at the time of forwarding the packet; and a conversion unit for performing number rewriting process of rewriting the sequence number and the Ack number contained in the TCP header of a packet to forward to the conversion sequence number and the conversion Ack number corresponding to the expected sequence number and the expected Ack number matching these numbers by referring to the number conversion table at the time of forwarding the packet.

<Packet Forwarding Method>

The packet forwarding method according to an exemplary aspect of the present invention is a method for rewriting and forwarding an AP header, namely, data following a TCP header of a packet flowing over a TCP connection between terminals in a gateway apparatus, and includes: a step in which the gateway apparatus registers, in a number conversion table, a pair of a sequence number which is expected to be contained in the TCP header of a next packet to forward and a sequence number after conversion which is obtained by considering a change in packet size due to AP header rewriting as a pair of an expected sequence number and a conversion sequence number as well as a pair of an expected Ack number and a conversion Ack number contained in the TCP header of a packet in a direction opposite to that of the previously forwarded packet at the time of forwarding the packet; and a step in which the gateway apparatus performs number rewriting process of rewriting the sequence number and the Ack number contained in the TCP header of a packet to forward to the conversion sequence number and the conversion Ack number corresponding to the expected sequence number and the expected Ack number matching these numbers by referring to the number conversion table at the time of forwarding the packet.

<Program>

The program according to an exemplary aspect of the present invention causes a computer including a gateway apparatus for rewriting and forwarding an AP header, namely, data following a TCP header of a packet flowing over a TCP connection between terminals, which includes a number conversion table including an entry for registering a pair of a sequence number which is expected to be contained in the TCP header of a next packet to forward and a sequence number after conversion which is obtained by considering a change in packet size due to AP header rewriting as a pair of an expected sequence number and a conversion sequence number as well as a pair of an expected Ack number and a conversion Ack number contained in the TCP header of a packet in a direction opposite to that of the previously forwarded packet at the time of forwarding the packet, to function as a conversion unit for performing number rewriting process of rewriting the sequence number and the Ack number contained in the TCP header of a packet to forward to the conversion sequence number and the conversion Ack number corresponding to the expected sequence number and the expected Ack number matching these numbers by referring to the number conversion table at the time of forwarding the packet.

BRIEF DESCRIPTION OF THE DRAWINGS

The exemplary objects and features of the present invention will become more apparent from the consideration of the following detailed description taken in conjunction with the accompanying drawings, in which:

FIG. 5 is a drawing showing an example configuration of the Seq/Ack# conversion table;

FIG. 6 is a drawing showing an example configuration of the Seq/Ack# conversion table;

FIG. 7 is an explanatory drawing of a conversion process of the Seq/Ack# conversion section;

FIG. 8-1 is a drawing showing an example configuration of a rewriting position management table;

FIG. 8-2 is a drawing showing an example of a packet before an AP header is rewritten;

FIG. 8-3 is a drawing showing an example of a packet after the AP header is rewritten;

FIG. 12 is a drawing showing an example operation of the Seq/Ack# conversion section after TCP connection establishment;

EXEMPLARY EMBODIMENT

Hereinafter, the best mode for carrying out the invention will be described in detail with reference to the accompanying drawings.

First Exemplary Embodiment

First, a first exemplary embodiment of the present invention will be described in detail with reference to drawings.
[Explanation of the Configuration]

Figure 1:
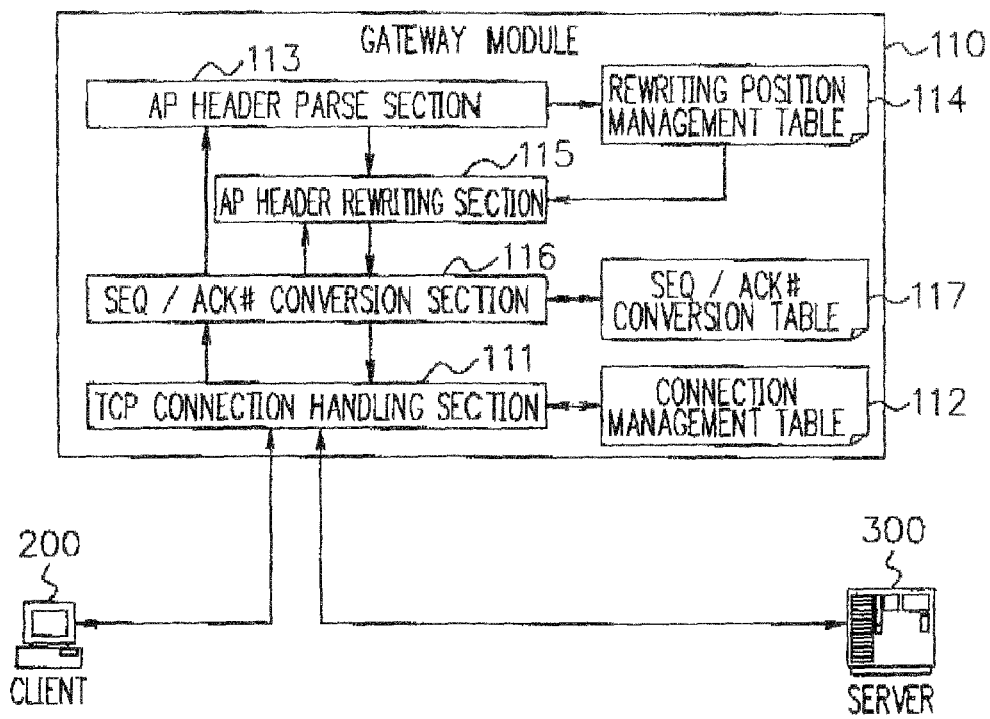
FIG. 1 is a block diagram of a gateway module in accordance with a first exemplary embodiment of the present invention.

With reference to FIG. 1, a gateway module 110 in accordance with a first exemplary embodiment of the present invention intercepts a packet sent and received between the two terminals without terminating the TCP connection between a client terminal (hereinafter referred to as a client) 200 and a server terminal (hereinafter referred to as a server) 300 and rewrites an application header (hereinafter referred to as an AP header) before forwarding it.

According to the present description, the AP header indicates all the data which an application program operating on the client 200 and the server 300 sends to the network. Examples of the application program include an HTTP client/server, an FTP client/server, and a SIP client/server exemplified by a Web browser/server, and the like. The data (that is the AP header) sent by such an application program is contained after the TCP header of a packet and flows over the network.

Figure 2:
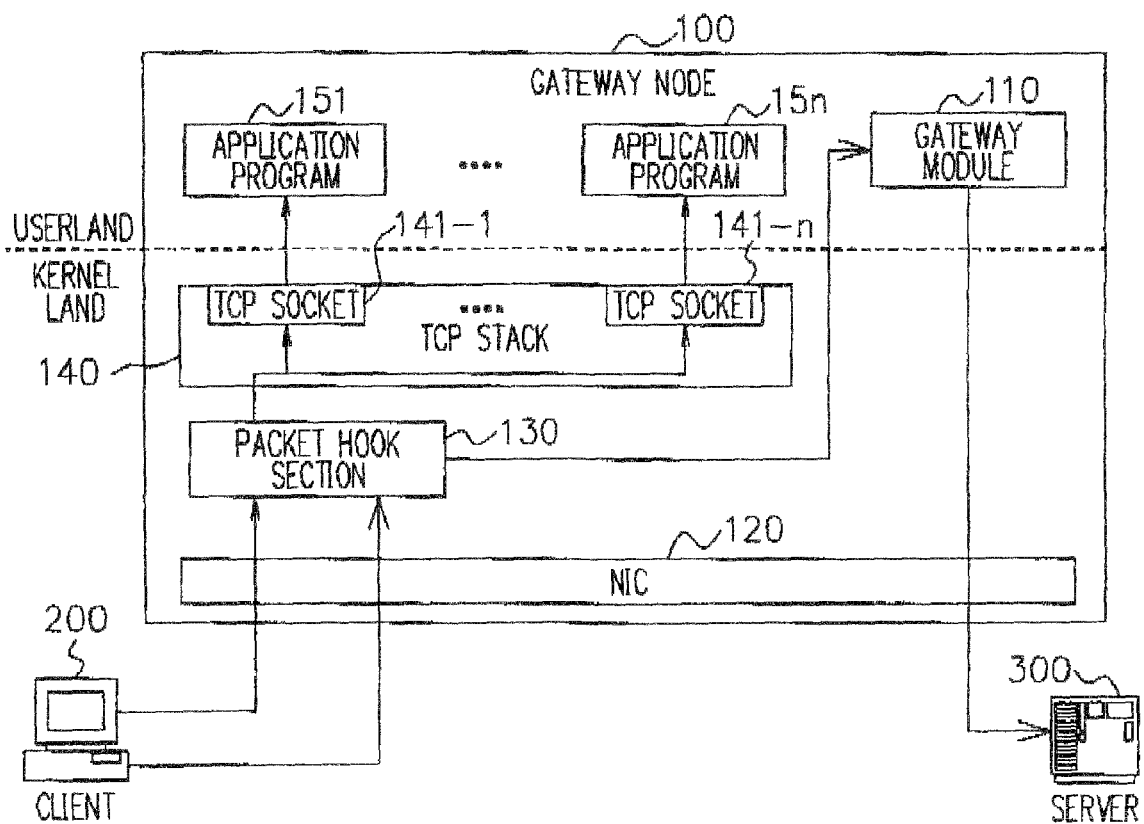
FIG. 2 is a block diagram showing an example layout of the gateway module.
Figure 3:
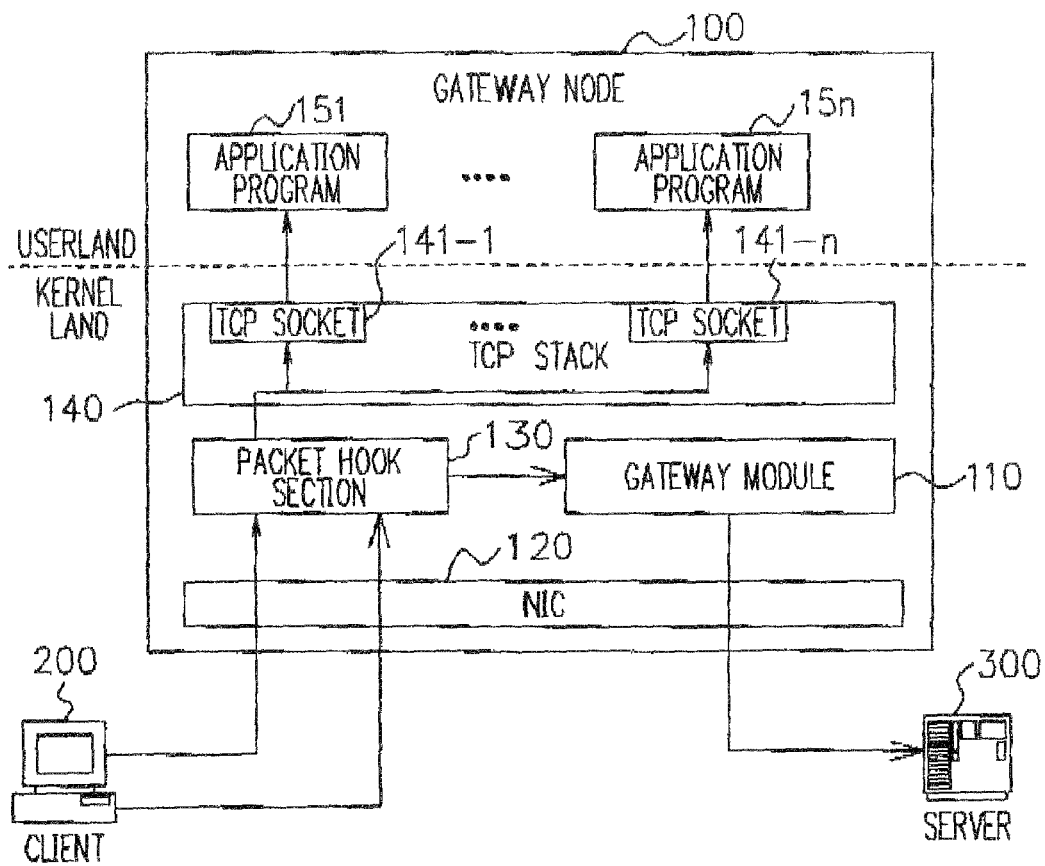
FIG. 3 is a block diagram showing an example layout of the gateway module.

FIGS. 2 and 3 each shows an example layout of the gateway module 110. In FIG. 2, the gateway module 110 is implemented as a module operating in the userland of a computer constituting the gateway node 100; while in FIG. 3, the gateway module 110 is implemented as a module operating in the kernel land thereof. In either configuration, a packet sent from the client 200 to the server 300 or contrary thereto, a packet sent from the server 300 to the client 200 is captured by a packet hook section 130 through a network interface card (NIC) of the gateway node 100 and is transmitted to a gateway module 110. The gateway module 110 rewrites the AP header and the Seq/Ack# of the TCP header of the packet and then, sends the rewritten packet to the server 300 or the client 200 through the NIC.

It should be noted that as shown in FIGS. 2 and 3, the gateway module 110 may be provided on the gateway node 100 independently of the client 200 and the server 300, or may be provided on the same node as the client 200 or the server 300. In addition, as shown in FIGS. 2 and 3, the gateway module 110 may include application programs 151 to 15$n$ which send and receive data in a stream format using a TCP stack 140, and TCP sockets 141-1 to 141-$n$ of the TCP stack 140.

By referring to FIG. 1 again, the gateway module 110 includes a TCP connection handling section 111, a connection management table 112, an AP header parse section 113, a rewriting position management table 114, an AP header rewriting section 115, a Seq/Ack# conversion section (corresponding to the conversion unit in claims) 116 and a Seq/Ack# conversion table (corresponding to the number conversion table in claims) 117. The connection management table 112, the rewriting position management table 114, and the Seq/Ack# conversion table 117 are implemented in a main storage or an auxiliary storage of a computer constituting the gateway module 110. The functional units such as the TCP connection handling section 111, the AP header parse section 113, the AP header rewriting section 115, and the Seq/Ack# conversion section 116 can be implemented by a computer and a program constituting the gateway module 110. The program is stored and provided in a computer-readable recording medium such as a magnetic disk and a semiconductor memory. When the computer is activated, the program is read by the computer. The program causes the computer to function as an individual functional unit by controlling the operation of the computer.

(Connection Management Table 112)

Figure 4:
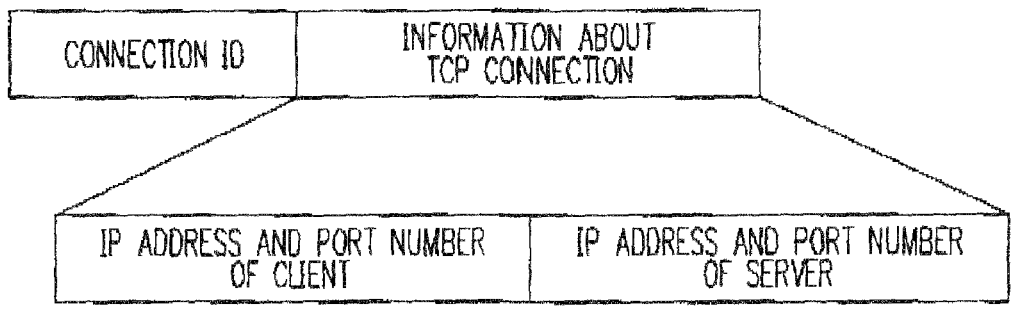
FIG. 4 is a drawing showing an example configuration of the connection management table.

The connection management table 112 is a storage unit for maintaining information about a TCP connection established between the client 200 and the server 300. One entry is used to manage the information about one TCP connection. As shown in FIG. 4, a connection ID and information about the TCP connection are registered in each entry. The information about the TCP connection includes, for example, the IP address and the port number of the client 200 and the server 300 respectively.

(TCP Connection Handling Section 111)

The TCP connection handling section 111 has a function to receive a packet sent by the client 200 and the server 300 from the packet hook section 130 shown in FIGS. 2 and 3, and pass the packet to the Seq/Ack# conversion section 116. In addition, the TCP connection handling section 111 has a function to transfer the packet passed from the Seq/Ack# conversion section 116 to the server 300 or the client 200 according to the transfer direction.

When a new TCP connection is established between the client and the server by a packet sent and received between the client 200 and the server 300, the TCP connection handling section 111 creates a new entry in the connection management table 112, in which the information about the established TCP connection is registered. When a TCP connection is deleted, the TCP connection handling section 111 deletes the corresponding entry from the connection management table 112.

(Seq/Ack# Conversion Table 117)

The Seq/Ack# conversion table 117 registers correspondences between the Seq# and the Ack# to be converted when the Seq# and the Ack# of a packet sent by the client 200 or the server 300 as well as the packet having the Seq# or the Ack# are transferred to the server 300 or the client 200. FIGS. 5 and 6 each shows an example of the Seq/Ack# conversion table 117.

In this example, the Seq/Ack# conversion table 117 consists of a client to server Seq/Ack# conversion table 117-1 (FIG. 5) used to convert the Seq/Ack# contained in a packet whose transfer direction is from client to server; and a server to client Seq/Ack# conversion table 117-2 (FIG. 6) used to convert the Seq/Ack# contained in a packet whose transfer direction is server to client.

Moreover, the client to server Seq/Ack# conversion table 117-1 consists of two kinds of tables; the client to server Seq# conversion table 117-11 used to convert the Seq# and the client to server Ack# conversion table 117-12 used to convert the Ack#. A pair of the connection ID, the Seq# (expected Seq#) contained in the packet received from the client 200 through the connection, and the Seq# (conversion Seq#) to be stored when the packet having the Seq# is transferred to the server 300 are registered as one entry of the client to server Seq# conversion table 117-11. In addition, a pair of the connection ID, the Ack# (expected Ack#) contained in the packet received from the client 200 through the connection, and the Ack# (conversion Ack#) to be stored when the packet having the Ack# is transferred to the server 300 are registered as one entry of the client to server Ack# conversion table 117-12.

Likewise, the server to client Seq/Ack# conversion table 117-2 consists of the two kinds of tables: the server to client Seq# conversion table 117-21 used to convert the Seq#; and the server to client Ack# conversion table 117-22 used to convert the Ack#. A pair of the connection ID, the Seq# (expected Seq#) contained in the packet received from the server 300 through the connection, and the Seq# (conversion Seq#) to be stored when the packet having the Seq# is transferred to the client 200 are registered as one entry of the server to client Seq# conversion table 117-21. In addition, a pair of the connection ID, the Ack# (expected Ack#) contained in the packet received from the server 300 through the connection, and the Ack# (conversion Ack#) to be stored when the packet having the Ack# is transferred to the client 200 are registered as one entry of the server to client Ack# conversion table 117-22.

(Seq/Ack# Conversion Section 116)

In order to allow the gateway module 110 to avoid a termination process of the TCP connection, at least the TCP flow control and retransmission control need be performed by the client 200 and the server 300 instead. Therefore, the client 200 and the server 300 must be able to detect packet loss from the Seq# and the Ack# of the received packet. However, if the gateway module 110 rewrites the AP header at packet transfer, the size of a packet sent by the client 200 or the server 300 is different from the size of a packet received by the server 300 or the client 200. Therefore, if the gateway module 110 transfers the packet received from the client 200 or the server 300 to the server 300 or the client 200 as is without rewriting the Seq# and the Ack# of the packet, the server 300 and the client 200 cannot properly know packet loss from the Seq# and the Ack#. For this reason, the Seq/Ack# conversion section 116 rewrites the Seq# and the Ack# of the received packet according to the change in packet size due to the AP header rewriting at packet transfer so that the client 200 and the server 300 can properly know packet loss from the Seq# and the Ack#.

More specifically, the Seq/Ack# conversion section 116 performs (1) a process of rewriting the Seq# and the Ack# in the TCP header of a packet passed from the TCP connection handling section 111 by referring to the Seq/Ack# conversion table 117 under its management; and (2) a process of managing the Seq/Ack# conversion table 117. Hereinafter, the individual processes will be described.

(1) The Process of Rewriting the Seq# and the Ack# in the TCP Header of a Packet Passed from the TCP Connection Handling Section 111.

The Seq/Ack# conversion section 116 rewrites the Seq# and the Ack# in the TCP header of a packet passed from the TCP connection handling section 111 by referring to the Seq/Ack# conversion table 117 in the following manner.

First, when a packet is passed from the TCP connection handling section 111, the Seq/Ack# conversion section 116 refers to the Seq/Ack# conversion table 117 corresponding to the transfer direction to find an entry having a connection ID corresponding to the TCP connection of the passed packet and having the expected Seq# which is the same as the Seq# of the TCP header of the packet. Next, the Seq/Ack# conversion section 116 rewrites the Seq# of the TCP header of the packet to the conversion Seq# of the found entry. For example, if a packet with the Seq#=xxx is received from the client 200 on a TCP connection corresponding to the connection ID 1, the Seq/Ack# conversion section 116 refers to the client to server Seq# conversion table 117-11 of FIG. 5 to find an entry having xxx in the client to server expected Seq#, and rewrites the Seq# of the packet to yyy written in the client to server conversion Seq# of the same entry.

Likewise in the case of Ack#, the Seq/Ack# conversion section 116 finds an entry having a connection ID corresponding to the TCP connection of the packet and having the expected Ack# which is the same as the Ack# of the TCP header of the packet, and rewrites the Ack# of the TCP header of the packet to the conversion Ack# of the corresponding entry. For example, when a packet with the Ack#=www is received from the client 200 on the TCP connection corresponding to the connection ID 1, the Seq/Ack# conversion section 116 refers to the client to server Ack# conversion table 117-12 of FIG. 5 to find an entry having the client to server expected Ack=www, and rewrites the Ack# of the packet to zzz written in the client to server conversion Ack# of the same entry.

Hereinbefore, the description was given to the process of rewriting the Seq/Ack# of a packet transferred from the client 200 to the server 300. On the contrary, the process of rewriting the Seq/Ack# of a packet transferred from the server 300 to the client 200 is performed by referring to the server to client Seq/Ack# conversion table 117-2 of FIG. 6.

The Seq/Ack# conversion section 116 rewrites the Seq/Ack#, and then, passes the packet to the AP header parse section 113. Afterward, when a packet is received from the AP header rewriting section 115, the Seq/Ack# conversion section 116 transfers the packet to the TCP connection handling section 111.

(2) Management of the Seq/Ack# Conversion Table 117

(2-1) Creation of a New Entry

When a packet is passed from the TCP connection handling section 111, the Seq/Ack# conversion section 116 calculates the Seq# of the next packet to be received (next receive packet) from the same node on the same TCP connection as that of the packet, and registers the Seq# as the expected Seq# in the Seq/Ack# conversion table 117. More specifically, the Seq/Ack# conversion section 116 registers the sum of the Seq# and the data size (size of the data following TCP header) of the packet passed from the TCP connection handling section 111 in the Seq/Ack# conversion table 117 as the expected Seq#. Since the registered expected Seq# is assumed to be the Ack# of the next receive packet, the Seq/Ack# conversion section 116 registers the expected Seq# in the Seq/Ack# conversion table 117 as the conversion Ack# in the transfer direction opposite to that of the next receive packet.

For example, when a packet having the connection ID=1, the Seq#=xxx–x, and the data size=x is received from the client 200, the Seq/Ack# conversion section 116 registers a new entry having the connection ID=1, the client to server expected Seq#=xxx, and the client to server conversion Seq#=NULL in the client to server Seq# conversion table 117-11 of FIG. 5; and registers a new entry having the connection ID=1, the server to client conversion Ack#=xxx, and the server to client expected Ack#=NULL in the server to client Ack# conversion table 117-22 of FIG. 6.

In addition, when a packet after AP header rewriting is passed from the AP header rewriting section 115, the Seq/Ack# conversion section 116 registers the Seq# of the next packet to forward (next forward packet) in the Seq/Ack# conversion table 117 as the conversion Seq# to the same node on the same TCP connection as that of the packet. More specifically, the Seq/Ack# conversion section 116 registers the sum of the Seq# of the packet passed from the AP header rewriting section 115 and the data size of the packet in the Seq/Ack# conversion table 117 as the conversion Seq#. In addition, since the registered conversion Seq# is assumed to be the Ack# of the next forward packet, the Seq/Ack# conversion section 116 registers the conversion Seq# in the Seq/Ack# conversion table 117 as the expected Ack# in the transfer direction opposite to that of the next forward packet.

For example, if a packet (i.e., a packet having the connection ID=1, Seq#=xxx-x, data size=x, sent from the client) shown in the previous example is received from the TCP connection handling section 111, is passed to the AP header parse section 113, and then, a packet having the Seq#=yyy-y and the data size=y is passed from the AP header rewriting section 115, the Seq/Ack# conversion section 116 finds an entry having the connection ID=1 and the client to server expected Seq#=xxx in the client to server Seq# conversion table 117-11 of FIG. 5, and registers yyy in the client to server conversion Seq# thereof; and finds an entry having the connection ID=1 and the server to client conversion Ack#=xxx in the server to client Ack# conversion table 117-22 of FIG. 6, and registers yyy in the server to client expected Ack# thereof. It should be noted that in this case, an entry having the expected Seq#=xxx-x and the conversion Seq#=yyy-y is registered in the Seq/Ack# conversion table 117.

The function of the Seq/Ack# conversion section 116 will be described again with reference to a simple example.

Now, as shown in FIG. 7, the gateway module 110 receives a packet P1 (Seq#=1 and data size=10) from the client 200, and rewrites the AP header thereof, and transfers it (Seq#=1 and data size=11) to the server 300 as the packet P1'.

The client 200 which sent the packet P1 knows that the Seq# of the packet P1 is 1 and data size is 10, and thus sets the Seq# of the next packet P1 to send to 11 (1+10). With that in mind, when the packet P1 is transferred, the Seq/Ack# conversion section 116 registers the sum of 1 (the Seq# of the P1) and 10 (the data size thereof), namely, 11, in the client to server Seq# conversion table 177-11 as the expected Seq# of the next packet to the packet P1.

In addition, since the Seq# of the P1' is 1 and the data size thereof is 11, a value of 12 (1+11) must be set as the Seq# of a packet next to P1' to be received by the server 300. With that in mind, when the packet P1' is transferred, the Seq/Ack# conversion section 116 registers the sum of 1 (the Seq# of the P1') and 11 (the data size thereof), namely, 12, in the client to server Seq# conversion table 117-11 as the conversion Seq# corresponding to the expected Seq#=11.

On the contrary, when the server 300 which received the packet P1' returns the ACK thereof to the client 200, since the Seq# of the packet P1' is 1 and the data size thereof is 11, the server 300 sends the Ack packet with Ack#=12. Then, when such an Ack packet is sent from the server 300, the gateway module 110 needs to transfer it as an Ack packet corresponding to the packet P1 to the client 200. Since the Seq# of the packet P1 is 1 and the data size thereof is 10, a value of 11 (1+10) needs to be set as the Ack# of the Ack packet corresponding to the packet P1. With that in mind, when packet P1 is transferred as the P1', the Seq/Ack# conversion section 116 registers an entry having the expected Ack#=12 and the conversion Ack#=11 in the server to client Ack# conversion table 117-22.

Then, as shown in FIG. 7, when the client 200 sends the packet P2 with Seq#=11, the Seq/Ack# conversion section 116 reads the conversion Seq#=12 corresponding to the expected Seq#=11 from the client to server Seq# conversion table 117-11, sets it to the Seq# of the packet P2' and sends it to the server 300.

Then, when the server 300 sends an Ack packet with Ack#=12, the Seq/Ack# conversion section 116 reads the conversion Ack#=11 corresponding to the expected Ack#=12 from the server to client Ack# conversion table 117-22, rewrites the Ack# of the Ack packet from 12 to 11, and sends it to the client 200.

(2-2) Deletion of the Existing Entry

The Seq/Ack# conversion section 116 deletes an entry from the Seq/Ack# conversion table 117 in the following cases. It should be noted that the entry deletion process may be omitted.

A) When the TCP connection between the client and the server is disconnected, all the entries having the connection ID corresponding to the disconnected TCP connection are deleted. The detailed process is as follows.

(a) When the RST packet sent by the client 200 or the server 300 is passed from the TCP connection handling section 111, the Seq/Ack# conversion section 116 deletes all the entries having the connection ID corresponding to the TCP connection of the RST packet immediately when the RST packet is passed.

(b) When the FIN packet sent by the client 200 or the server 300 is passed from the TCP connection handling section 111, when the FIN packet is passed, the Seq/Ack# conversion section 116 waits for the time (2 MSL time) when the FIN sender side (active close side) moves from the TIME_WAIT state to the CLOSED state, and then, deletes all the entries having the connection ID corresponding to the TCP connection of the FIN packet. More specifically, at the time when the Ack sent by the active close side is passed from the TCP connection handling section 111, the Seq/Ack# conversion section 116 determines that the active close side enters the TIME_WAIT state, waits for 2 MSL time since then, and deletes the entries.

B) When the TCP connection times out, when no packet has been sent for a predetermined period of time since the last packet was sent on the TCP connection, the Seq/Ack# conversion section 116 determines that TCP connection times out due to a cable disconnection or a machine abend, and deletes all the entries having the connection ID corresponding to the TCP connection.

C) When the sender of the packet receives the Ack corresponding to the packet, the retransmission of the packet may be performed until the sender of the packet receives the Ack corresponding to the packet. In case of such a retransmission, the Seq/Ack# conversion section 116 deletes the entry of the Seq/Ack# conversion table 117 after the sender of the packet receives the Ack corresponding to the packet having the expected Seq# of the entry.

TCP introduces a parameter called a receive Window Size as a maximum amount of data that can be sent without receiving Ack. The Seq/Ack# conversion section 116 uses the receive Window Size to determine whether the packet sender receives the Ack corresponding to the sent packet or not before deleting the entry of the Seq/Ack# conversion table 117. The detailed deletion process is as follows.

When a packet is passed from the TCP connection handling section 111, the Seq/Ack# conversion section 116 finds an entry having the expected Seq# or the conversion Ack#, whichever has a value smaller than the value obtained by subtracting the receive Window size from the Seq# of the passed packet (the expected Seq# or the conversion Ack#<the Seq# of the received packet−the receive Window Size) and having the connection ID corresponding to the connection used to receive the packet, and deletes the entry. For example, assuming the Seq/Ack# conversion table 117 shown in FIGS. 5 and 6, when a packet having Seq#=xxx+receive Window Size+α(α>0) sent by the client is received from the TCP connection handling section 111, the Seq/Ack# conversion section 116 deletes the entry having xxx in the client to server expected Seq# (server to client conversion Ack#) from the table.

It should be noted that the receive Window Size used above is classified into the following two kinds of values; (1) a maximum receive Window Size usable on the TCP connection calculated from the Window Scale option value determined at TCP connection establishment and (2) a receive Window Size (reported by the Window Size in the TCP header of the packet) successively reported from the opposite end of the TCP connection after TCP connection establishment.

When (1) is used, the Seq/Ack# conversion section 116 calculates the maximum receive Window Size from the Window Scale option value determined when TCP connection is established between the client and the server and uses it to delete the entry of the Seq/Ack# conversion table 117. It should be noted that the Window Scale option value may be different depending on the client to server and the server to client, and thus the Seq/Ack# conversion section 116 calculates the maximum receive Window Size for each case. For example, if a value of 4 is reported as Window Scale option value from the server 300 to the client 200 at TCP connection establishment, the Seq/Ack# conversion section 116 uses a value (1048560 bytes) obtained by multiplying a default maximum receive Window Size value of 65535 bytes by a value of 16 (24) as the server to client maximum receive Window Size and uses it to delete the entry of the client to server Seq/Ack# conversion table 117-1. Moreover, the Seq/Ack# conversion section 116 uses the client to server maximum receive Window Size to delete the entry of the server to client Seq/Ack# conversion table 117-2.

When (2) is used, the Seq/Ack# conversion section 116 monitors the Window Size of the TCP header of the packet to store the maximum receive Window Size reported on the same TCP connection for each direction, either client to server or server to client direction, and uses it to delete the entry of the Seq/Ack# conversion table 117. For example, regarding the process of a packet received from the client 200, the Seq/Ack# conversion section 116 uses the maximum receive Window Size of the receive Window Size reported from the server 300 to the client 200 on the same TCP connection by that time to delete the entry of the client to server Seq/Ack# conversion table 117-1. On the contrary, regarding the process of a packet received from the server 300, the Seq/Ack# conversion section 116 uses the receive Window Sizes which have been reported from the client 200 to the server 300 to delete the entry of the server to client Seq/Ack# conversion table 117-2. Regarding the case (2), the Window Size needs to be monitored for all packets to be forwarded, but the Window Size used to delete an entry is smaller than that for the case (1). Accordingly, the size of the Seq/Ack# conversion table 117 can be kept smaller than that for the case (1).

[Process of the Retransmitted Packet]

Regarding a packet retransmitted by the client 200 or the server 300, the management process of the Seq/Ack# conversion table 117 has already been completed, and the detection result of a rewriting position has already been recorded in the rewriting position management table 114 as described below. Therefore, the Seq/Ack# conversion section 116 does not perform the above process (2), but instead performs the process (1). Afterward, the Seq/Ack# conversion section 116 may perform the process of passing the packet directly to the AP header rewriting section 115 without passing the packet to the AP header parse section 113. The Seq/Ack# conversion section 116 calculates the expected Seq# about the packet passed from the TCP connection handling section 111. As a result, if the entry having the expected Seq# has already been registered in the Seq/Ack# conversion table 117, the Seq/Ack# conversion section 116 determines that the packet is a retransmitted packet.

(Rewriting Position Management Table 114)

Figures 1, 2, 8:
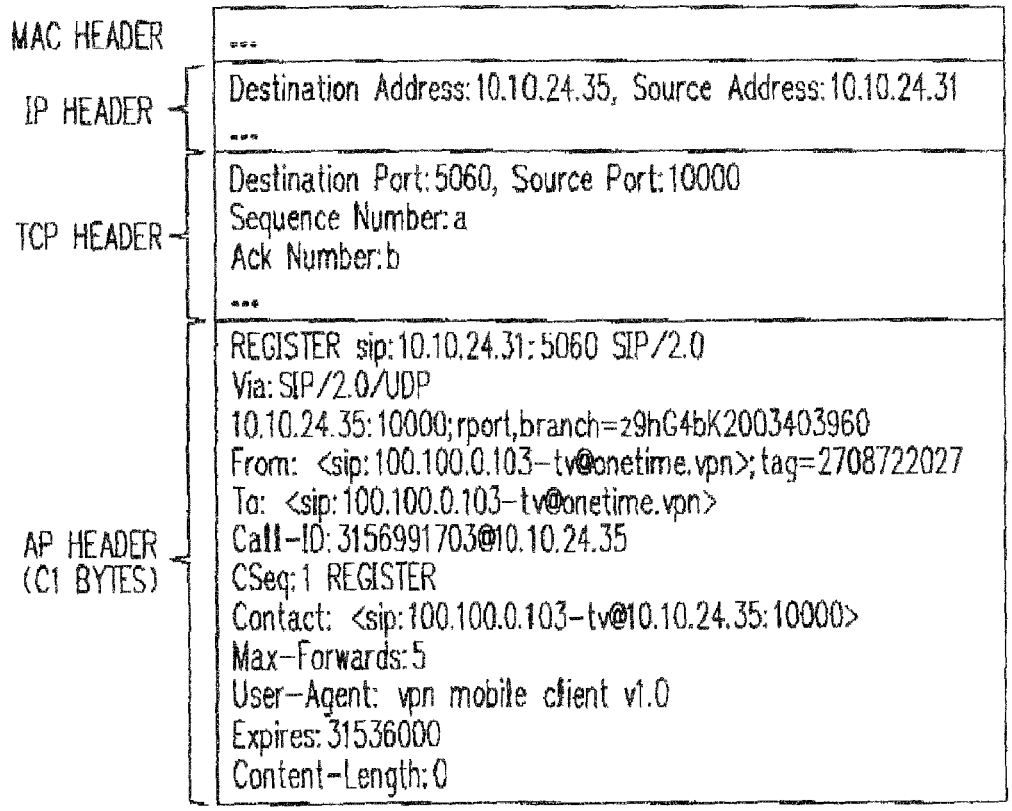

The rewriting position management table 114 is a storage unit which maintains the correspondence between the Seq# of a packet on the TCP connection and the AP header rewriting position for each packet transfer direction. FIG. 8-1 shows an example of the rewriting position management table 114. In the example shown in FIG. 8-1, the rewriting position management table 114 has one table for each packet transfer direction (client to server and server to client), and maintains a pair of the connection ID, the Seq#, and the rewriting position for each entry in the table. For example, the first entry of the client to server rewriting position management table of FIG. 8-1 indicates that the connection ID is 1, the Seq# is a, and the packet rewriting position includes three positions: $\alpha$, $\beta$, and $\gamma$. In addition, the first entry of the server to client rewriting position management table indicates that the connection ID is 1, the Seq# is b, and the packet rewriting position includes three positions: $\delta$, $\epsilon$, $\xi$.

(AP Header Parse Section 113)

The AP header parse section 113 has a function to parse the AP header of the packet passed from the Seq/Ack# conversion section 116, namely, the data following the TCP header and search for the AP header rewriting position. When the rewriting position is detected, the AP header parse section 113 registers the connection ID of the TCP connection of the packet, the Seq# of the packet, and the rewriting position in a new entry of the rewriting position management table 114.

Further, in the cases: (A) when the TCP connection between the client and the server is disconnected, (B) when TCP connection times out, and (C) when the sender of the packet receives the Ack of the packet, the AP header parse section 113 deletes the entry of the rewriting position management table 114 in the same manner as the Seq/Ack# conversion section 116 deletes the entry of the Seq/Ack# conversion table 117.

After the above process is performed, the AP header parse section 113 passes the packet to the AP header rewriting section 115.

(AP Header Rewriting Section 115)

The AP header rewriting section 115 refers to the rewriting position management table 114 and rewrites the AP header of the packet passed from the AP header parse section 113. The AP header rewriting example has already been described in the Description of the Related Art. For example, the SIP URI contained in the AP header is encoded in ASCII or the like. Accordingly, if the SIP URI is rewritten to another SIP URI, the number of characters is changed and thus the packet size is also changed.

[Description of the Operation]

Next, with reference to the sequence diagrams in FIGS. 9 to 12 and the flowchart in FIG. 13, the operation of the gateway module 110 of FIG. 1 will be described with an emphasis on the operation of the Seq/Ack# conversion section 116.

(At TCP Connection Establishment)

Figure 9:
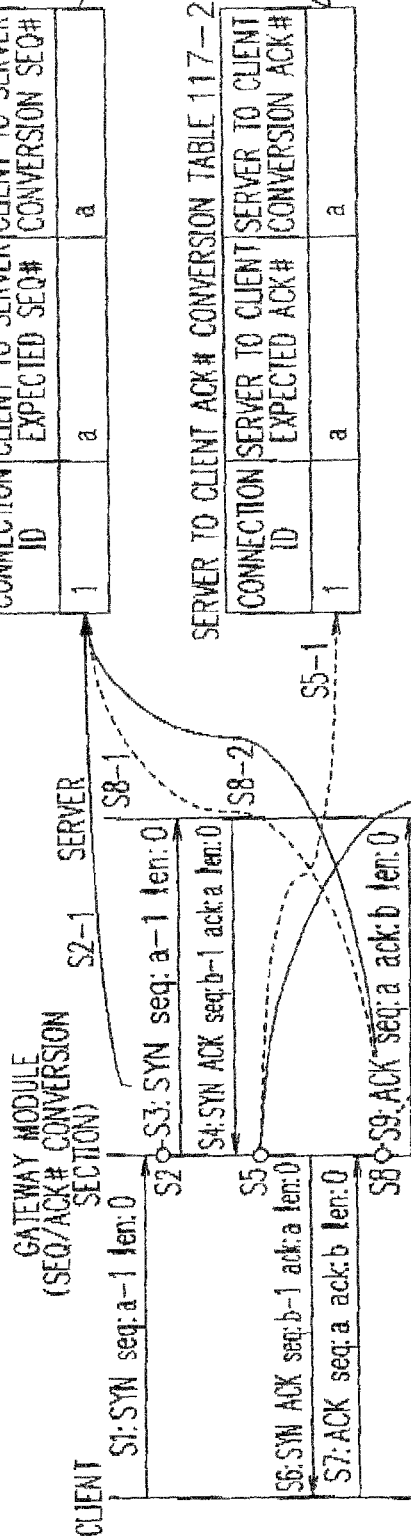
FIG. 9 is a drawing showing an example operation of the Seq/Ack# conversion section at TCP connection establishment.

FIG. 9 shows an example operation of the gateway module 110 at TCP connection establishment between the client and the server.

[At SYN Transfer]

When the gateway module 110 intercepts a SYN packet sent by the client 200 (S1 of FIG. 9), the TCP connection handling section 111 allocates a new connection ID thereto (1 is allocated in FIG. 9), registers the entry having the connection ID, the source IP address and the source port number of the SYN packet in the connection management table 112, and passes the SYN packet to the Seq/Ack# conversion section 116.

Figure 13:
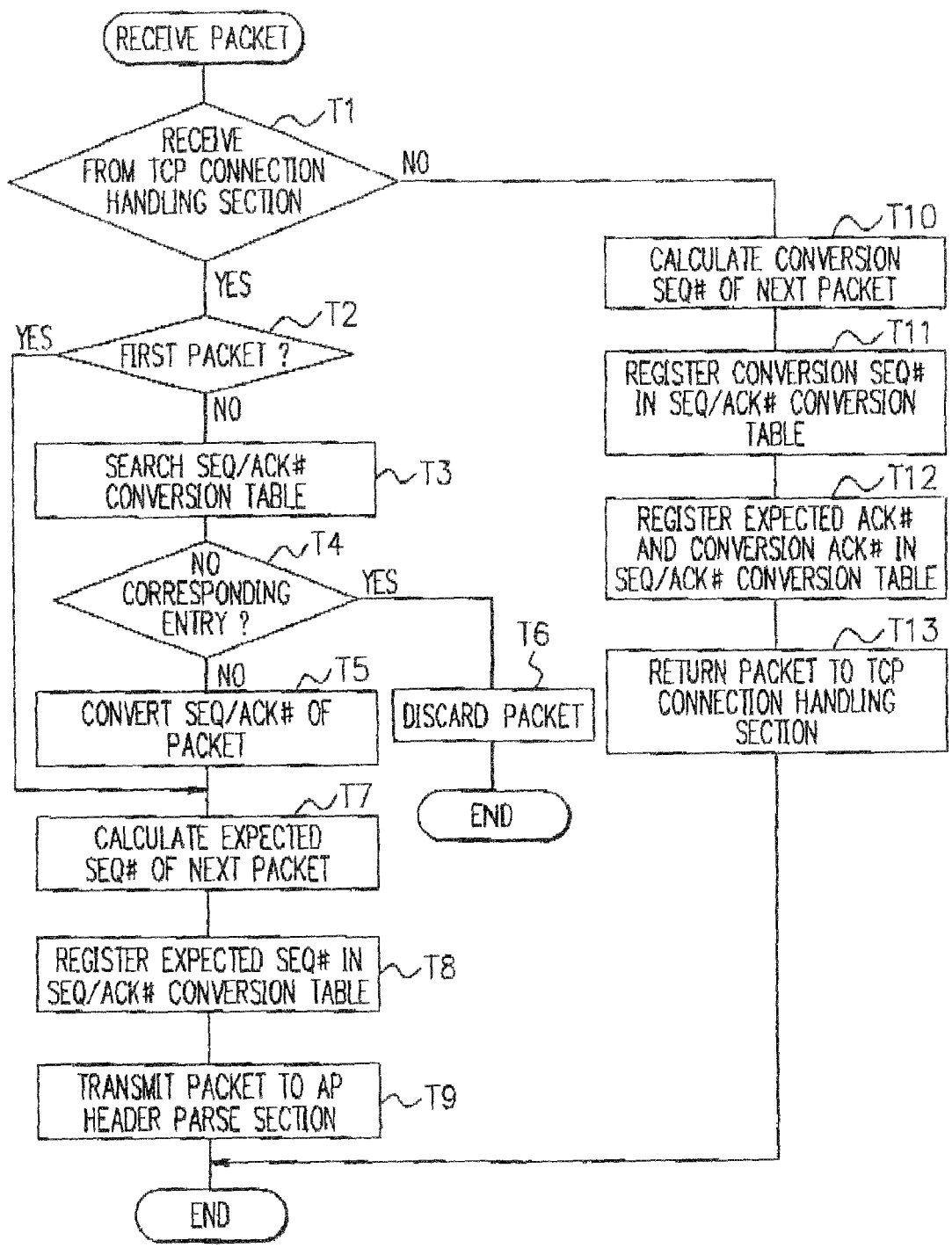
FIG. 13 is a flowchart showing an example process of the Seq/Ack# conversion section.

When the SYN packet is passed from the TCP connection handling section 111, the Seq/Ack# conversion section 116 calculates the Seq# of the next receive packet from the Seq# of the SYN packet (T7 of FIG. 13 with YES in T1 and T2). In the example of FIG. 9, the Seq# of the SYN packet is a−1. Since the SYN packet consumes the Seq# by 1 under TCP protocol conventions, the Seq# of the next receive packet becomes a−1+1=a. The Seq/Ack# conversion section 116 registers the entry having the Seq# of the calculated next receive packet as the client to server expected Seq# in the client to server Seq# conversion table 117-11 (S2-1 of FIG. 9), and passes the SYN packet to the AP header parse section 113 (T8 and T9 of FIG. 13).

Since the SYN packet does not contain data following the TCP header, the AP header parse section 113 passes the SYN packet to the AP header rewriting section 115 without registering a new entry in the rewriting position management table 114. Since the rewriting position information of the SYN packet is not registered in the rewriting position management table 114, the AP header rewriting section 115 passes the SYN packet as is to the Seq/Ack# conversion section 116 without performing AP header rewriting.

The Seq/Ack# conversion section 116 calculates the Seq# of the next packet to forward from the passed SYN packet (T1 and T10 of FIG. 13). In the example of FIG. 9, the Seq# of the SYN packet passed from the AP header rewriting section 115 is a−1. Therefore, the Seq# of the next packet to forward becomes a−+1=a. When the packet is passed from the TCP connection handling section 111, the Seq/Ack# conversion section 116 creates an entry of the client to server Seq# conversion table 117-11, and the Seq/Ack# conversion section 116 registers the calculated Seq# of the next packet to forward in the created entry thereof as the client to server conversion Seq# (S2-1 of FIG. 9 and T11 of FIG. 13).

In addition, the Seq/Ack# conversion section 116 creates an entry having the client to server expected Seq# as the server to client conversion Ack# and an entry having the client to server conversion Seq# as the server to client expected Ack#. Then, the Seq/Ack# conversion section 116 registers the created entries in the server to client Ack# conversion table 117-22 (S2-2 of FIG. 9 and T12 of FIG. 13). Afterward, the Seq/Ack# conversion section 116 passes the SYN packet to the TCP connection handling section 111 (T13 of FIG. 13).

The TCP connection handling section 111 transfers the packet passed from the Seq/Ack# conversion section 116 to the server 300 (S3 of FIG. 9).

[At SYN ACK Transfer]

Next, when the gateway module 110 intercepts the SYN ACK packet sent by the server 300 (S4 of FIG. 9), the TCP connection handling section 111 passes the SYN ACK packet to the Seq/Ack# conversion section 116. Since the entry corresponding to the received SYN ACK packet has already been registered in S2 of FIG. 9, the TCP connection handling section 111 does not create a new entry in the connection management table 112.

When the SYN ACK packet is passed from the TCP connection handling section 111, the Seq/Ack# conversion section 116 refers to the Seq/Ack# conversion table 117 to rewrite the Seq#/Ack# (T1 to T5 of FIG. 13). Since the passed SYN ACK packet is a packet to be transferred from the server to the client, the Seq/Ack# conversion section 116 refers to the server to client expected Seq/Ack# table 117-2. More specifically, the Seq/Ack# conversion section 116 searches for an entry having the same server to client expected Seq# and the server to client expected Ack# as the Seq# and the Ack# of the passed packet (T3 of FIG. 13), and rewrites the Seq#/Ack# of the passed packet to the server to client conversion Seq# and the server to client conversion Ack# written in the entry (S5-1 of FIG. 9 and T5 of FIG. 13). It should be noted that S5 of FIG. 9 indicates a timing of receiving a packet from the server 300 on the TCP connection for the first time. Since there is no entry having the server to client expected Seq# and the server to client conversion Seq#, the Seq/Ack# conversion section 116 does not rewrite the Seq#. Since the entry corresponding to the Ack# exists, the Seq/Ack# conversion section 116 performs rewriting. However, in this case, the expected Ack# and the conversion Ack# in the entry are the same, and thus the rewritten value is the same.

Here, if the entry having the same server to client expected Seq# and the server to client expected Ack# as the Seq# and the Ack# of the passed packet is not registered in the Seq/Ack# conversion table 117, the Seq/Ack# conversion section 116 discards the packet (T6 of FIG. 13). The reason is that the previous packet used to calculate the expected Seq# and the expected Ack# of the current packet causes packet loss. Even if the packet is discarded is this manner, no problem occurs since the sender retransmits the packet.

Subsequently, the Seq/Ack# conversion section 116 registers a new entry in the Seq/Ack# conversion table 117 (T8 of FIG. 13). First, the Seq# of the next receive packet is calculated from the Seq# of the SYN ACK packet. In the example of FIG. 9, the Seq# of the SYN ACK packet is b−1. Therefore, the Seq# of the next receive packet becomes b−1+1=b. The Seq/Ack# conversion section 116 registers the entry having the Seq# of the calculated next receive packet as the server to client expected Seq# in the server to client Seq# conversion table 117-21, and passes the SYN ACK packet to the AP header parse section 113 (T9 of FIG. 13).

Since the SYN ACK packet does not contain data following the TCP header, the AP header parse section 113 passes the SYN ACK packet to the AP header rewriting section 115 without registering a new entry in the rewriting position management table 114. Since the rewriting position information of the SYN ACK packet is not registered in the rewriting position management table 114, the AP header rewriting section 115 passes the SYN ACK packet as is to the Seq/Ack# conversion section 116 without performing AP header rewriting.

The Seq/Ack# conversion section 116 calculates the Seq# of the next packet to forward from the passed SYN ACK packet (T1 and T10 of FIG. 13). In the example of FIG. 9, the Seq# of the SYN ACK packet passed from the AP header rewriting section 115 is b−1. Therefore, the Seq# of the next packet to forward b 1+1=b. When a packet is passed from the TCP connection handling section 111, the Seq/Ack# conversion section 116 creates an entry in the server to client Seq# conversion table 117-21. Then, the Seq/Ack# conversion section 116 registers the calculated Seq# of the next packet to forward in the created entry as the server to client conversion Seq# (S5-2 of FIG. 9 and T11 of FIG. 13).

In S5-2 of FIG. 9, the Seq/Ack# conversion section 116 creates an entry having the server to client expected Seq# as the client to server conversion Ack# and an entry having the server to client conversion Seq# as the client to server expected Ack#, and registers the created entries in the client to server Ack# conversion table 117-12 (S5-3 of FIG. 9 and T12 of FIG. 13). Afterward, the Seq/Ack# conversion section 116 passes the SYN ACK packet to the TCP connection handling section 111 (T13 of FIG. 13).

The TCP connection handling section 111 transfers the packet passed from the Seq/Ack# conversion section 116 to the client 200 (S6 of FIG. 9).

[At ACK Transfer]

Next, when the gateway module 110 intercepts the ACK packet sent by the client 200 (S7 of FIG. 9), the TCP connection handling section 111 passes the Ack packet to the Seq/Ack# conversion section 116. Since the entry corresponding to the received SYN ACK packet has already been registered in S2 of FIG. 9, a new entry is not created in the connection management table 112.

When the ACK packet is passed from the TCP connection handling section 111, the Seq/Ack# conversion section 116 refers to the Seq/Ack# conversion table 117 to rewrite the Seq#/Ack# (T1 to T5 of FIG. 13). Since the passed ACK packet is a packet to be transferred from the client to the server, the Seq/Ack# conversion section 116 refers to the client to server Seq/Ack# conversion table 117-1. More specifically the Seq/Ack# conversion section 116 searches for the entry having the same client to server expected Seq# and the client to server expected Ack# as the Seq# and the Ack# of the passed packet (T3 of FIG. 13). Then, the Seq/Ack# conversion section 116 rewrites the Seq#/Ack# of the passed packet to the client to server conversion Seq# and the client to server conversion Ack# written in the entry (S8-1 and S8-3 of FIG. 9, and T5 of FIG. 13). However, in this case, the expected Seq#/Ack# and the conversion Seq#/Ack# in the entry are the same, and thus the Seq# and the Ack# of the ACK packet is rewritten to the same value as the one passed from the TCP connection handling section 111.

In addition, the Seq/Ack# conversion section 116 registers a new entry in the Seq/Ack# conversion table 117 (T8 of FIG. 13). First, the Seq/Ack# conversion section 116 calculates the Seq# of the next receive packet from the Seq# of the ACK packet. In the example of FIG. 9, the Seq# of the ACK packet is a. Since the ACK packet does not contain data following the TCP header, the Seq# of the next receive packet becomes a+0=a. The Seq/Ack# conversion section 116 registers the entry having the Seq# of the calculated next receive packet as the client to server expected Seq# in the client to server Seq# conversion table 117-11 (S8-2 of FIG. 9), and passed the ACK packet to the AP header parse section 113 (T9 of FIG. 13).

Since the ACK packet does not contain data following the TCP header, no AP header rewriting is performed, and the ACK packet is passed as is from the AP header rewriting section 115 to the Seq/Ack# conversion section 116.

The Seq/Ack# conversion section 116 calculates the Seq# of the next packet to forward from the ACK packet passed from the AP header rewriting section 115 (T1 and T10 of FIG. 13). In the example of FIG. 9, the Seq# of the ACK packet passed from the AP header rewriting section 115 is a, and thus the Seq# of the next packet to forward becomes a+0=a, The Seq/Ack# conversion section 116 registers the calculated Seq# of the next packet to forward in the entry of the client to server Seq# conversion table 117-11 created when the packet is passed from the TCP connection handling section 111 as the client to server conversion Seq# (S8-2 of FIG. 9 and T11 of FIG. 13).

In addition, the Seq/Ack# conversion section 116 registers the entry having the client to server expected Seq# as the server to client conversion Ack#, and the entry having the client to server conversion Seq# as the server to client expected Ack# registered in S8-2 of FIG. 9, in the server to client Ack# conversion table 117-22 (S8-4 of FIG. 9 and T12 of FIG. 13). Afterward, the Seq/Ack# conversion section 116 passes the ACK packet to the TCP connection handling section 111 (T13 of FIG. 13).

The TCP connection handling section 111 transfers the packet passed from the Seq/Ack# conversion section 116 to the server 300 (S9 of FIG. 9).

[Other Operation Modes (Simplified Operation) at TCP Connection Establishment]

Hereinbefore, the operation of the gateway module 110 at TCP connection establishment has been described with an emphasis on the operation of the Seq/Ack# conversion section 116. The above description focuses on the operation mode in which the Seq/Ack# conversion section 116 operates in the same manner at TCP connection establishment as at packet transfer after TCP connection establishment. However, at TCP connection establishment, no packet containing data following the TCP header is forwarded and no AP header rewriting is performed. Therefore, the operation of the Seq/Ack# conversion section 116 can be simplified more than that of packet transfer after TCP connection establishment.

More specifically, the following operations (a) to (d) can be omitted at TCP connection establishment.

(a) Sending and receiving a packet between the AP header parse section 113 and the AP header rewriting section 115

Since a packet to forward at TCP connection establishment contains no AP header, there is no need to pass the packet passed from the TCP connection handling section 111 to the AP header parse section 113.

(b) Calculating the conversion Seq#/Ack#

Since no AP header rewriting is performed on a packet to forward at TCP connection establishment, no packet size is changed at transfer. Therefore, the value of the conversion Seq#/Ack# is the same as that of the corresponding expected Seq#/Ack#.

(c) Rewriting the Seq# and the Ack# at packet transfer

Since no AP header rewriting is performed on a packet to forward at TCP connection establishment, no packet size is changed at transfer. Therefore, there is no need to rewrite the Seq/Ack#.

(d) Creating an entry in the Seq/Ack# conversion table 117 at ACK packet transfer There is no need to create the same entry in the Seq/Ack# conversion table 117 as the one created at SYN packet transfer.

(After TCP Connection Establishment and at Packet Transfer)

[Client to Server]

Figure 10:
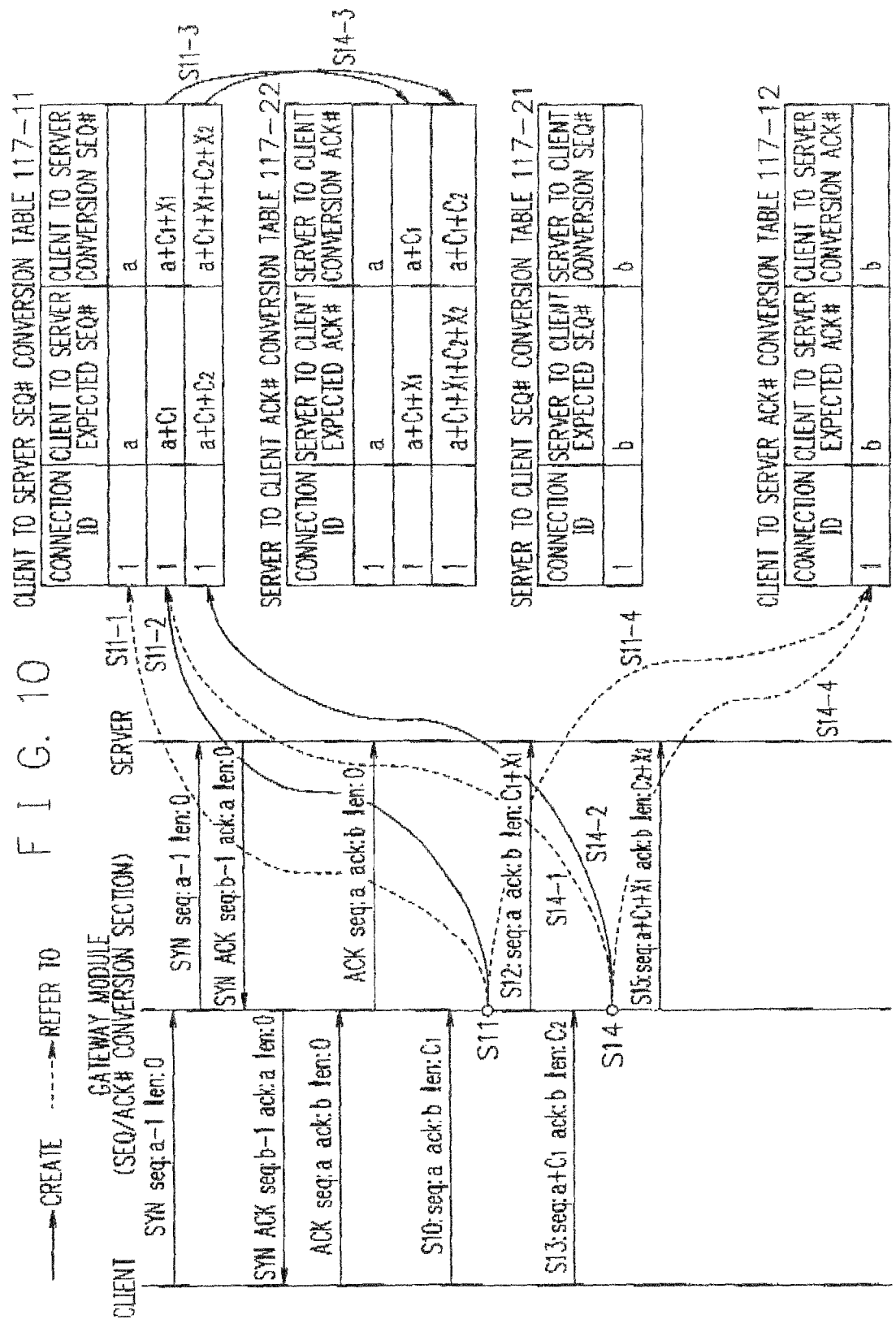
FIG. 10 is a drawing showing an example operation of the Seq/Ack# conversion section after TCP connection establishment.

FIG. 10 shows an example operation of the gateway module 110 forwarding a packet sent from the client 200 to the server 300 after TCP connection establishment.

When the gateway module 110 intercepts a packet sent by the client 200 (S10 of FIG. 10), the TCP connection handling section 111 passes the packet to the Seq/Ack# conversion section 116.

When the packet is passed from the TCP connection handling section 111, the Seq/Ack# conversion section 116 refers to the client to server Seq# conversion table 117-1 of the Seq/Ack# conversion table 117 to rewrite the Seq#/Ack# (T1 to T5 of FIG. 13). More specifically, the Seq/Ack# conversion section 116 searches for an entry having the same client to server expected Seq# and the client to server expected Ack# as the Seq# and the Ack# of the passed packet, and rewrites the Seq#/Ack# of the passed packet to the client to server conversion Seq# and the client to server conversion Ack# written in the entry (S11-1 and S11-4 of FIG. 10). In S11 of FIG. 10, the Seq# is rewritten from a to a, and the Ack# is rewritten from b to b, Moreover, the Seq/Ack# conversion section 116 registers a new entry in the Seq/Ack# conversion table 117 (T7 and T8 of FIG. 13). First, the Seq/Ack# conversion section 116 calculates the Seq# of the next receive packet from the Seq# of the packet. In the example of S11 in FIG. 10, the Seq# of the packet is a, and the packet contains C1 byte of data following the TCP header. Therefore, the Seq# of the next receive packet becomes a+C1. The Seq/Ack# conversion section 116 registers an entry having the calculated Seq# of the next receive packet as the client to server expected Seq#, in the client to server Seq# conversion table 117-11 (S11-2 of FIG. 10), and passes the packet to the AP header parse section 113 (T9 of FIG. 13).

The AP header parse section 113 parses the AP header of the passed packet to determine the rewriting position, registers the rewriting position in the rewriting position management table 114, and then, passes the packet to the AP header rewriting section 115. The AP header rewriting section 115 refers to the rewriting position management table 114 to perform AP header rewriting of the packet, and then, passes the packet to the Seq/Ack# conversion section 116. Examples of the packet before and after the AP header rewriting are shown in FIGS. 8-2 and 8-3. These examples are based on a rewriting rule saying that the character string "_cugA" is inserted in front of the at mark sign @ of the SIP URI. With reference to FIG. 8-2, the AP header of the packet before rewriting contains three @ signs in front of the SIP URI. Therefore, the AP header parse section 113 detects each of the positions in front of the @ signs as the rewriting position, and registers the positions in the rewriting position management table 114. For example, assuming the start position of the AP header as the 0th byte, the position in front of the first @ sign as the αth byte, the position in front of the second @ sign as the βth byte, the position in front of the third @ sign as the γth byte, for example, as shown in the first entry of FIG. 8-1, the AP header parse section 113 registers the three positions: α, β, and γ as the rewriting positions of the packet having the connection ID−1 and the Seq#=a, in the rewriting position management table 114. The AP header rewriting section 115 refers to the first entry of FIG. 8-1 to insert the character string "_cugA" in the αth byte, the βth byte, and the γth byte of the AP header of the packet shown in FIG. 8-2. As a result, the AP header of the packet is rewritten as shown in FIG. 8-3. It should be noted that in this example, the rewriting increases the data size of the packet by X1.

The Seq/Ack# conversion section 116 calculates the Seq# of the next packet to forward from the packet passed from the AP header rewriting section 115 (T1 and T10 of FIG. 13). In the example of S11 in FIG. 10, the Seq# of the packet passed from the AP header rewriting section 115 is a, and the packet contains C1+X1 bytes of data following the TCP header. Therefore, the Seq# of the next packet to forward becomes a+C1+X1. The Seq/Ack# conversion section 116 registers the calculated Seq# of the next packet to forward as the client to server conversion Seq#, in the entry of the client to server Seq# conversion table 117-11 created when the packet is passed from the TCP connection handling section 111 (S11-2 of FIG. 10 and S11 of FIG. 13).

Moreover, the Seq/Ack# conversion section 116 registers the entry having the client to server expected Seq# as the server to client conversion Ack# and the entry having the client to server conversion Seq# as the server to client expected Ack# which are registered in S11-2 of FIG. 10, in the server to client Ack# conversion table 117-22 (S11-3 of FIG. 10 and T12 of FIG. 13). Afterward, the Seq/Ack# conversion section 116 passes the packet to the TCP connection handling section 111 (T13 of FIG. 13).

TCP connection handling section 111 transfers the packet passed from the Seq/Ack# conversion section 116 to the server 300 (S12 of FIG. 10).

Hereinafter, when the gateway module 110 intercepts a packet sent by the client 200, the same processes as described above will be repeated (S13 to S15 of FIG. 10).

[Server to Client]

Figure 11:
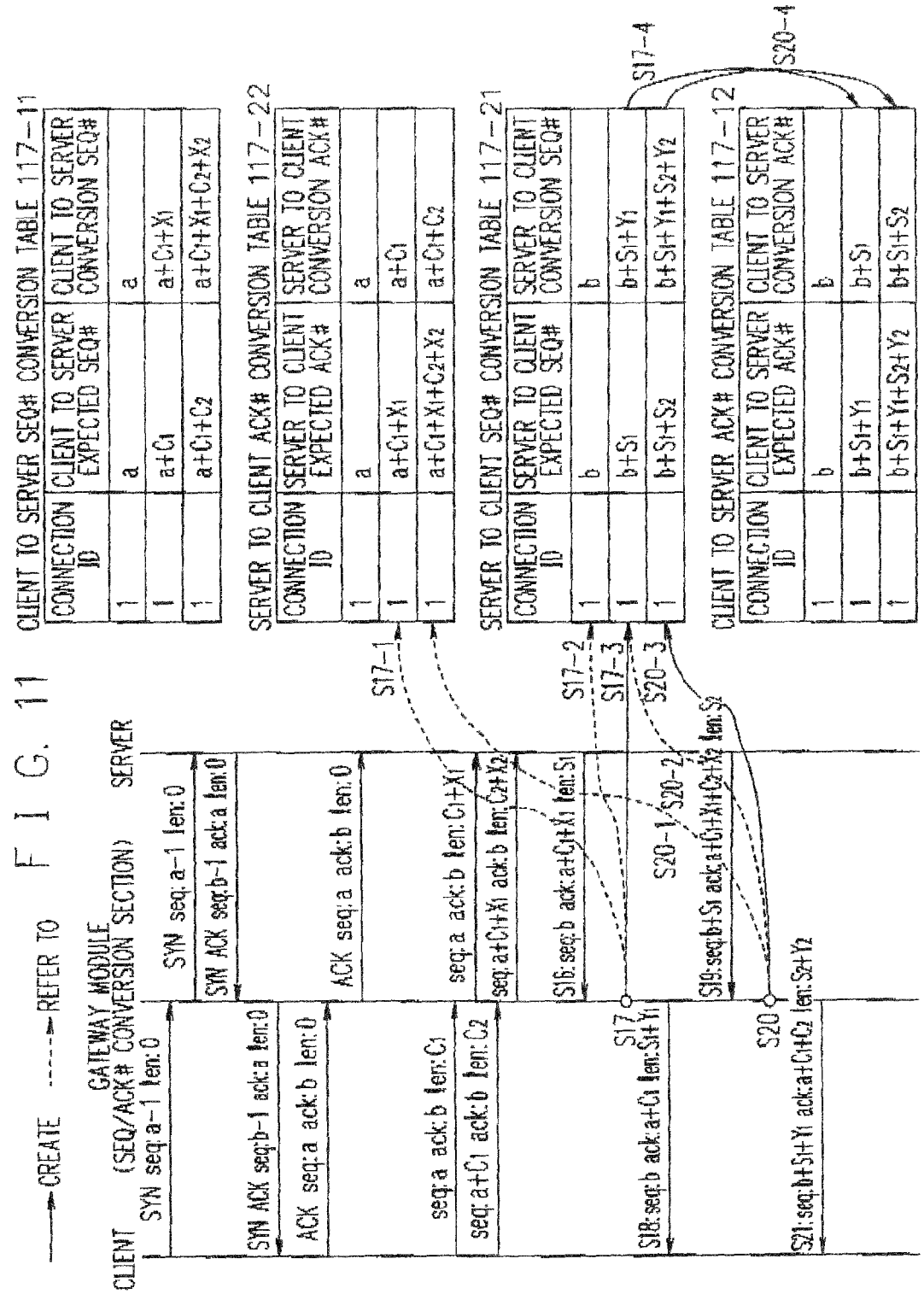
FIG. 11 is a drawing showing an example operation of the Seq/Ack# conversion section after TCP connection establishment.

FIG. 11 shows an example operation of the gateway module 110 forwarding a packet sent from the server 300 to the client 200 after TCP connection establishment.

When the gateway module 110 intercepts a packet sent by the server 300 (S16 of FIG. 11), the TCP connection handling section 111 passes the packet to the Seq/Ack# conversion section 116.

When a packet is passed from the TCP connection handling section 111, the Seq/Ack# conversion section 116 refers to the server to client Seq/Ack# conversion table 117-2 of the Seq/Ack# conversion table 117 to rewrite the Seq#/Ack# (T1 to T5 of FIG. 13). More specifically, the Seq/Ack# conversion section 116 searches for the entry having the same server to client expected Seq# and the server to client expected Ack# as the Seq# and the Ack# of the passed packet and rewrites the Seq#/Ack# of the passed packet to the server to client conversion Seq# and the server to client conversion Ack# written in the entry (S17-1 and 17-2 of FIG. 11). In S17 of FIG. 11, the Seq# is rewritten from b to b, and the Ack# is rewritten from a+C1+X1 to a+C1.

Moreover, the Seq/Ack# conversion section 116 registers a new entry in the Seq/Ack# conversion table 117 (T7 and T8 of FIG. 13). First, the Seq/Ack# conversion section 116 calculates the Seq# of the next receive packet from the Seq# of the packet. In the example of S17 in FIG. 11, the Seq# of the packet is b, and the packet contains S1 bytes of data following the TCP header. Therefore, the Seq# of the next receive packet becomes b+S1. The Seq/Ack# conversion section 116 registers the entry having the calculated Seq# of the packet next receive as the server to client expected Seq# in the server to client Seq# conversion table 117-21 (S17-3 of FIG. 11), and passes the packet to the AP header parse section 113 (T9 of FIG. 13).

The AP header parse section 113 parses the AP header of the passed packet to determine the rewriting position, registers a new entry in the rewriting position management table 114, and then, passes the packet to the AP header rewriting section 115. The AP header rewriting section 115 refers to the rewriting position management table 114 to rewrite the packet, and then passes the packet to the Seq/Ack# conversion section 116. It should be noted that in the example of S17 in FIG. 1, the rewriting increases the data size of the packet by Y1.

The Seq/Ack# conversion section 116 calculates the Seq# of the next packet to forward from the packet passed from the AP header rewriting section 115 (T1 and T10 of FIG. 13). In the example of S17 in FIG. 11, the Seq# of the packet passed from the AP header rewriting section 115 is b and the packet contains S1+Y1 bytes of data following the TCP header. Therefore, the Seq# of the next packet to forward becomes b+S1+Y1. The Seq/Ack# conversion section 116 registers the calculated Seq# of the next packet to forward as the server to client conversion Seq# in the entry of the server to client Seq# conversion table 117-21 created when the packet is passed from the TCP connection handling section 111 (S17-3 of FIG. 11 and T11 of FIG. 13).

In addition, the Seq/Ack# conversion section 116 registers the entry having the server to client expected Seq# as the client to server conversion Ack# and the entry having the server to client conversion Seq# as the client to server expected Ack#, which were registered in S17-3 of FIG. 11, in the client to server Ack# conversion table 117-12 (S17-4 of FIG. 11 and T12 of FIG. 13). Afterward, the Seq/Ack# conversion section 116 passes the packet to the TCP connection handling section 111 (T12 of FIG. 13).

The TCP connection handling section 111 transfers the packet passed from the Seq/Ack# conversion section 116 to the client 200 (S18 of FIG. 11).

Subsequently, when the gateway module 110 intercepts a packet sent by the server 300, the same processes as described above will be repeated (S19 to S21 of FIG. 11).

(At Entry Deletion)

Figure 12:
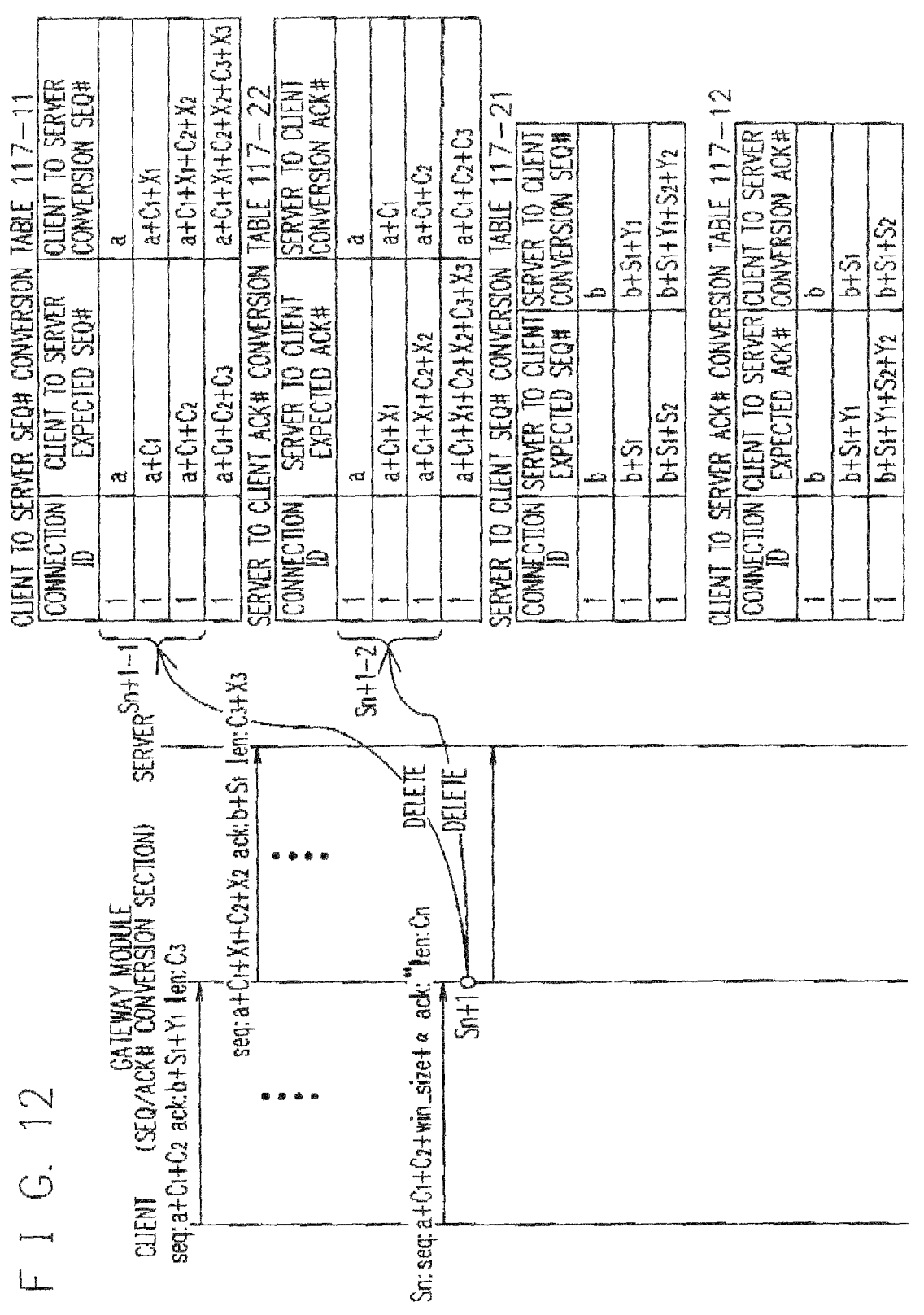

FIG. 12 shows an example operation of the gateway module 110 deleting an entry of the Seq/Ack# conversion table 117.

When the gateway module 110 intercepts a packet sent by the client 200 (Sn of FIG. 12), the Seq/Ack# conversion section 116 refers to the client to server Seq# conversion table 117-11 and the server to client Ack# conversion table 117-22, and deletes the entry having the client to server expected Seq# and the server to client conversion Ack# whose values are smaller than the value obtained by subtracting the Window Size value from the Seq# of the packet sent by the client 200. In the example of Sn in FIG. 12, the Seq# of the received packet is a+C1+C2+window_size+α ($\alpha$>0). Therefore, the entry having the client to server expected Seq# and the server to client conversion Ack# whose value is equal to or less than a+C1+C2 is deleted (Sn+1, Sn+1−1, and Sn+1−2 of FIG. 12).

Likewise, when the gateway module 110 intercepts a packet sent by server 300, the Seq/Ack# conversion section 116 deletes the entry corresponding to the server to client Seq# conversion table 117-21 and the client to server Ack# conversion table 117-12 in the same manner as described above.

Figure 14:
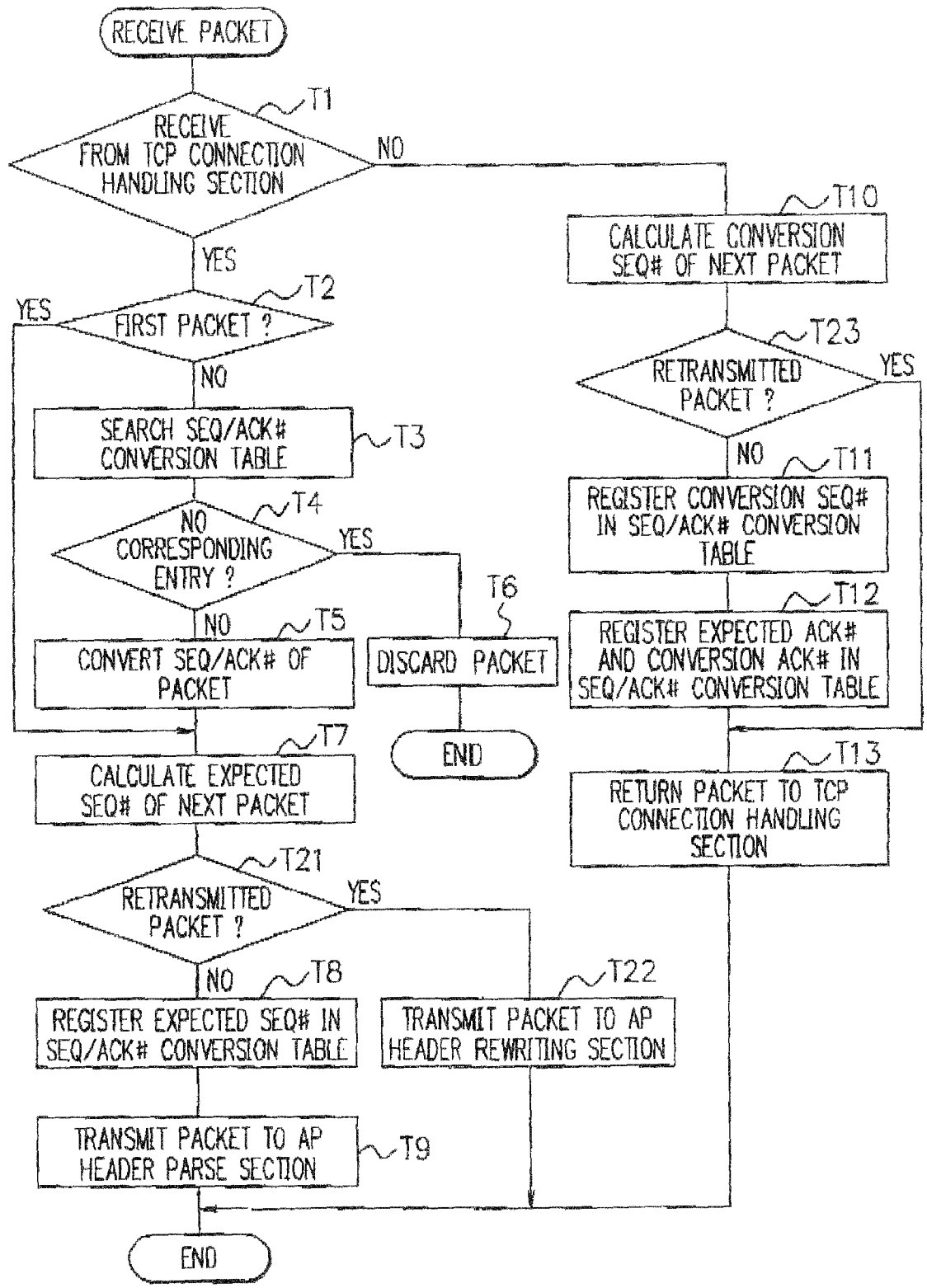
FIG. 14 is a flowchart showing another example process of the Seq/Ack# conversion section.

As described above, when the client 200 or the server 300 retransmits a packet, the Seq/Ack# conversion section 116 omits the registration process in the Seq/Ack# conversion table 117 and the rewriting position management table 114, and passes the packet directly to the AP header rewriting section 115. In this case, the Seq/Ack# conversion section 116 performs the process shown in FIG. 14 instead of the process of FIG. 13. Here, in Step T21, Seq/Ack# conversion section 116 determines that the packet is a retransmitted packet when a determination is made that the entry having the expected Seq# has already been registered in the Seq/Ack# conversion table 117 based on the calculation of the expected Seq# of the packet passed from the TCP connection handling section 111. Then, in Step T22, the packet is directly passed from the Seq/Ack# conversion section 116 to the AP header rewriting section 115. Further, in Step T23, a determination is made as to whether to skip the Steps T11 and T12 or not depending on whether the packet received from the AP header rewriting section 115 is determined as a retransmitted packet in Step T21.

Hereinafter, the advantages of the present exemplary embodiment will be described.

The first advantage is that the gateway apparatus forwarding a packet by rewriting the AP header thereof needs not terminate the TCP connection, and thereby, the gateway apparatus can reduce load thereof.

The reason is that the Seq/Ack# conversion section 116 in the gateway module 110 rewrites the Seq# and the Ack# of the packet according to the change in packet size due to AP header rewriting, and then forwards the packet to the client 200 and the server 300, which allows the client 200 and the server 300 to properly confirm packet loss from the Seq# and the Ack#. Accordingly, the client 200 and the server 300 can perform packet retransmission control and flow control.

The second advantage is that various tables 117 and 114 maintained by the gateway module 110 can be kept smaller in size.

The reason is that, of the packets forwarded by the gateway module 110, regarding the packet in which the corresponding Ack is guaranteed to be delivered from the receiving side to the sender, the Seq/Ack# conversion section 116 and the AP header parse section 113 erase the entry corresponding to the packet from the Seq/Ack# conversion table 117 and the rewriting position management table 114 respectively.

The third advantage is that the number of AP header parse processes by the gateway module 110 can be reduced.

The reason is that, of the packets forwarded by the gateway module 110, the packet in which the entry having the same expected Seq# as the Seq# of the forwarded packet has already been registered in the Seq/Ack# conversion table 117 is determined as a retransmitted packet, the AP header parse process by the AP header parse section 113 is not performed on the retransmitted packet.

Second Exemplary Embodiment

Hereinafter, the second exemplary embodiment of the present invention will be described in detail with reference to drawings.

When a client and a server communicate using the TCP connection, a message sent and received between the client and the server may divided into a plurality of packets before transmission (a message is fragmented). For example, generally UDP is used as the transport protocol, but the SIP specifies that when the SIP message larger than the maximum transmission unit (MTU), the largest packet size allowed by the network, is sent and received, TCP should be used as the transport protocol.

In such a case, packet buffering is performed to reconstruct the message and then AP header parse is performed, which is advantageous to confirm the AP header rewriting position.

For example, if the rewriting position is detected by a specific text pattern, the text pattern may extend beyond a plurality of packets (e.g., assuming the text pattern "ip addr", "i" is placed in the end of the first packet and "p addr" is placed in the start of the second packet). In such a case, in order to deal with such a case without reconstructing the message, a process of storing the end portion of the packet according to the text pattern and the like is needed (for example, in the above example, five or more bytes of data need to be always stored as the end portion of the packet).

If message reconstruction is not performed, a process of dealing with the above described message fragmentation becomes more complicated as the AP header rewriting position detection rule becomes complicated, and such a process can only deal with a specific rewriting position detection rule, which lacks general purpose applicability.

On the contrary, message reconstruction is advantageous to general purpose applicability in that although packet buffering is required, message reconstruction can be implemented by detecting the end position (start position) of the message in the packet; the process of detecting the end position (start position) of the message is often assumed to be simpler than the AP header rewriting position detection process; the detection rule is uniquely determined by the application level protocol without depending on a specific rewriting position detection rule.

From such a point of view, the gateway module 110' of the second exemplary embodiment has a function to perform packet buffering and message reconstruction in case of message fragmentation. In addition, the required buffer storage space is reduced by minimizing the number of packets to be buffered.

Figure 15:
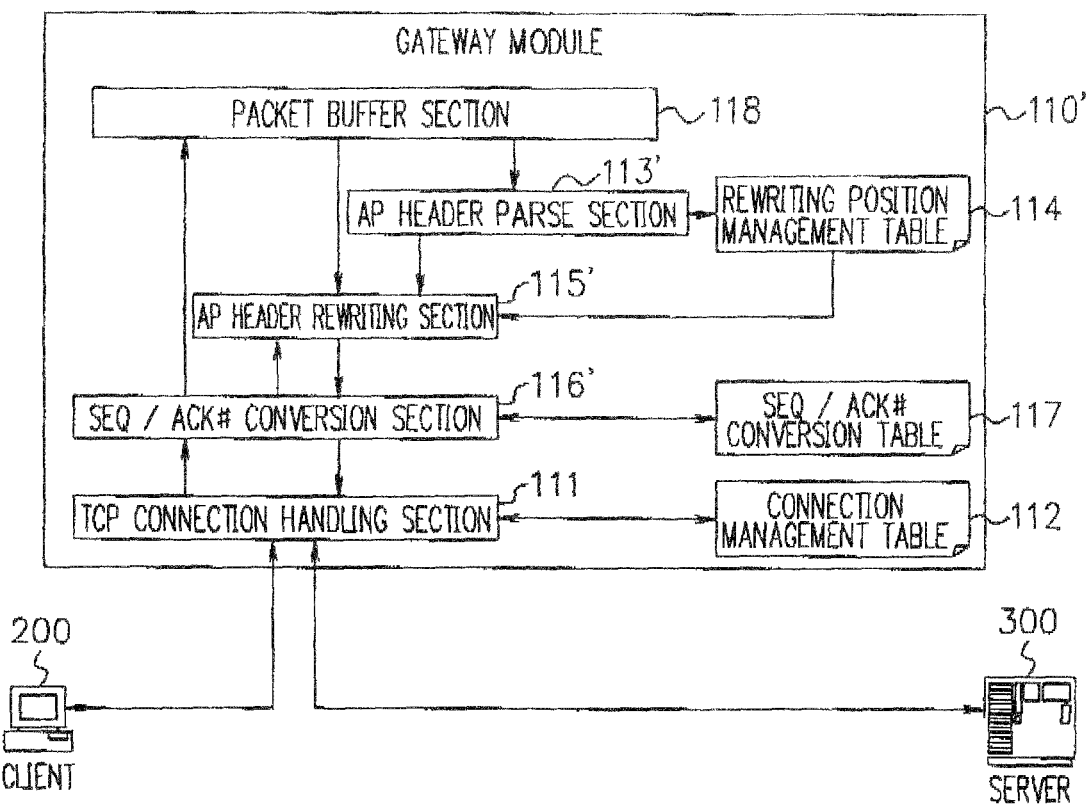
FIG. 15 is a block diagram of a gateway module in accordance with a second exemplary embodiment of the present invention.

With reference to FIG. 15, the gateway module 110' of the second exemplary embodiment is different from the gateway module 110 of the first exemplary embodiment in that it has a packet buffer section 118 for message reconstruction. Moreover, since the packet buffer section 118 is provided, a function of the Seq/Ack# conversion section 116', the AP header rewriting section 115', and the AP header parse section 113' are partially different from the Seq/Ack# conversion section 116, the AP header rewriting section 115, and the AP header parse section 113 of the gateway module 110 of the first exemplary embodiment.

Hereinafter, of the components of the gateway module 110' of the present exemplary embodiment, the components different in operation from those of the first exemplary embodiment will be described (undescribed components are the same in operation as the components of the first exemplary embodiment).

(Seq/Ack# Conversion Section 116')

The Seq/Ack# conversion section 116' receives a packet from the TCP connection handling section 111, performs the processes (1) and (2) explained in the description of the Seq/Ack# conversion section 116 in accordance with the first exemplary embodiment, and then, passes the packet to the packet buffer section 118. The operation of the Seq/Ack# conversion section 116' when a packet is passed from the AP header rewriting section 115' is the same as that in the first exemplary embodiment.

[Process of the Retransmitted Packet]

It should be noted that the message end position and the rewriting position of the packet retransmitted by the client 200 or the server 300 has already been detected and the results have been recorded in the rewriting position management as table described later. Accordingly, the packet may be passed directly to the AP header rewriting section 115' without passing it to the packet buffer section 118 (i.e. packet buffering and AP header parsing may not be performed). Further, the process (2) (Seq/Ack# conversion table management) may also be omitted in the same manner as for the Seq/Ack# conversion section 116 in accordance with the first exemplary embodiment. A determination as to whether the packet passed from the TCP connection handling section 111 is a retransmitted packet or not is made in the same manner as for the Seq/Ack# conversion section 116 in accordance with the first exemplary embodiment.

(Packet Buffer Section 118)

When a packet is received from the Seq/Ack# conversion section 116', the packet buffer section 118 has a function to store the packet in a buffer and reconstruct the fragmented message.

More specifically, when a packet is received from the Seq/Ack# conversion section 116', the packet buffer section 118 stores the packet in a buffer and searches all the packets in the buffer for the message end position starting with the last detected message end position. It should be noted that the message end position search is started immediately after the TCP header of the packet sent by the client 200 or the server 300 for the first time after TCP connection establishment.

When the message end position search reaches the end of the packets stored in the buffer (i.e., last packet received from the Seq/Ack# conversion section 116') and the message end position is detected, the packet buffer section 118 notifies the AP header parse section 113' of the start position (immediately after the end position of the last detected message under most of the application protocols) and the end position of all the messages whose end positions have been detected, as well as passes to the AP header rewriting section 115' all the packets except the packet stored in the buffer for the last time after the AP header parse section 113' completes the rewriting position detection, and deletes them from the buffer. When the message end position matches the end of the last buffered packet, all the packets including the last buffered packet are passed to the AP header rewriting section 115' and are deleted from the buffer. It should be noted that the process of deleting packets from the buffer may be omitted for all the cases.

When nothing is detected as a result of message end position detection, the packet buffer section 118 does nothing.

Figure 16:
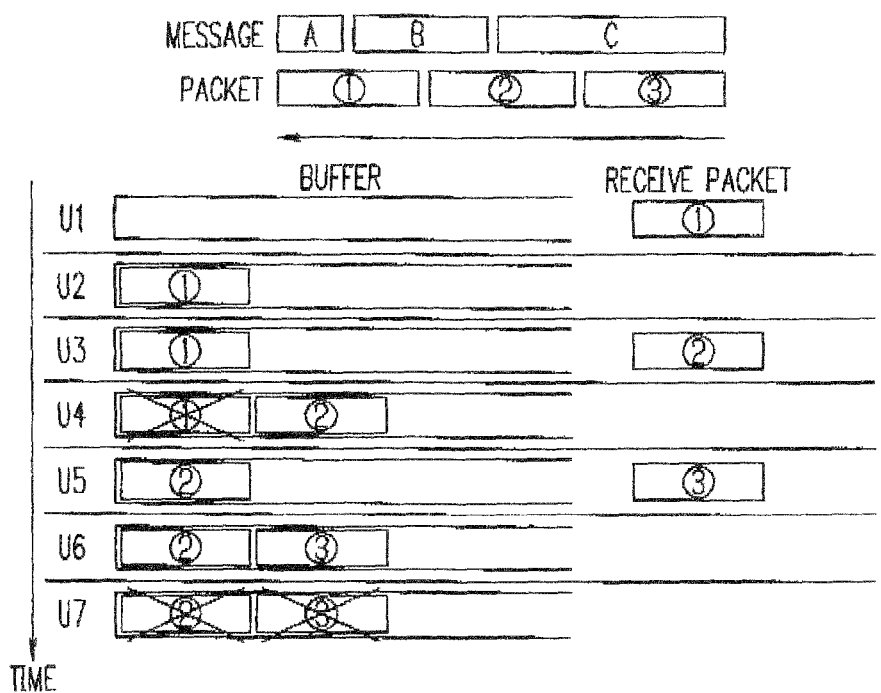
FIG. 16 is an explanatory drawing of the operation of a packet buffer section.

FIG. 16 shows an example operation of the packet buffer section 118. In the example shown in FIG. 16, the messages A, B, and C are sent by the packets (1), (2), and (3). The message A is contained in the packet (1), the message B is contained in the packets (1) and (2), and the message C is contained in the packets (2) and (3) respectively. Hereinafter, the operation will be described step by step.

U1 and U2 of FIG. 16:

When the packet (1) is received, the packet buffer section 118 stores the packet (1) in the buffer and searches for the message end position. Here, the end position of the message A is determined. After the message end position search reaches the end of the packet, the packet buffer section 118 notifies the AP header parse section 113' of the start position and the end position of the message A. Since the packet (1) contains part of the message B, the packet (1) remains as is in the buffer.

U3 of FIG. 16:

When the packet (2) is received, the packet buffer section 118 stores the packet (2) in the buffer and searches for the message end position. Here, the end position of the message B is determined. After the message end position search reaches the end of the packet, the packet buffer section 118 notifies the AP header parse section 113' of the start position and the end position of the message B.

U4 of FIG. 16:

Since detection of the start position and the end position of the message contained in the packet (1) has been completed, the packet buffer section 118 detects the rewriting position and then discards the packet (1) from the buffer as well as passes the packet (1) to the AP header rewriting section 115'. Since the packet (2) contains part of the message C, the packet (2) remains as is in the buffer.

U5 and 6 of FIG. 16:

When the packet (3) is received, the packet buffer section 118 stores the packet (3) in the buffer and searches for the message end position. Here, the end position of the message C is determined. After the message end position search reaches the end of the packet, the packet buffer section 118 notifies the AP header parse section 113' of the start position and the end position of the message B.

U7 of FIG. 16:

Since detection of the start position and the end position of the message contained in the packets (2) and (3) has been completed, the packet buffer section 118 detects the rewriting positions and then discards the packets (2) and (3) from the buffer as well as passes the packet (2) and (3) to the AP header rewriting section 115'.

(AP Header Parse Section 113')

When the report of the start position and the end position of the message is received from the packet buffer section 118, the AP header parse section 113' searches the packets buffered in the packet buffer section 118 for the rewriting position in the reported range from the start position to the end position, and registers the entry having the detected rewriting position in the rewriting position management table 114. It should be noted that the process of registering and deleting the entry in and from the rewriting position management table 114 is the same as that of the AP header parse section 113 in accordance with the first exemplary embodiment.

(AP Header Rewriting Section 115')

When a packet is received from the packet buffer section 118, the AP header rewriting section 115' refers to the rewriting position management table 114 to confirm the rewriting position of the packet, and rewrites the AP header thereof. After AP header rewriting, the packet is passed to the Seq/Ack# conversion section 116'.

The present exemplary embodiment can provide the same first to third advantages as the first exemplary embodiment as well as the following advantages.

The fourth advantage is that the number of packets buffered in the gateway module 110' can be maintained smaller.

The reason is that the packet buffer section 118 performs the message start/end position search process such that when the end position of the application protocol message is detected in the last stored packet and the AP header parse section 110' completes the analysis of the message, all the packets except the last stored packet are erased from the buffer.

The fifth advantage is that the number of end position search processes of the application protocol message can be maintained smaller.

The reason is that, of the packets forwarded by the gateway module 110', if an entry having the same expected Seq# as the Seq# of the packet has already been registered in the Seq/Ack# conversion table 117, the packet is determined as a retransmitted packet. Accordingly, the packet buffer section 118 does not store the retransmitted packet in the buffer and does not perform the end position search on the application protocol message.

Hereinbefore, the exemplary embodiments of the present invention have been described, but the above exemplary embodiments are preferred exemplary embodiments of the present invention. That is, the present invention is not limited to the above exemplary embodiments, those skilled in the art can construct forms with various changes by making modifications and equivalents to the above individual exemplary embodiments without departing from the spirit and scope of the present invention. For example, an exemplary embodiment of discarding a specific packet without forwarding may be constructed. More specifically, there is a case in which the entire AP header contained in the packet is deleted depending on the AP header rewriting rule. Even in such a case, by considering that the packet size of x (>0) bytes before rewriting is changed to 0 bytes after rewriting, the same process as at ordinary rewriting (i.e., case in which the packet size does not become 0 after AP header rewriting) may be performed. However, a packet with the packet size of 0 bytes is a null packet consisting only of the IP header and the TCP header. Therefore, packet forwarding may be meaningless and a waste of network band (except a packet with the packet size of 0 bytes before rewriting). Therefore, a process of discarding and not forwarding such a packet as the entire AP header thereof is deleted after rewriting may be performed.

What is claimed is:

1. A gateway apparatus for rewriting and forwarding an application header, namely, data following a TCP header of a packet flowing over a TCP connection between terminals, comprising:

a number conversion table including an entry for registering a pair of a sequence number which is expected to be contained in the TCP header of a next packet to forward and a sequence number after conversion which is obtained by considering a change in packet size due to application header rewriting as a pair of an expected sequence number and a conversion sequence number as well as a pair of an expected Ack number and a conversion Ack number contained in the TCP header of a packet in a direction opposite to that of the forwarded packet at the time of forwarding the packet; and a conversion unit for performing number rewriting process of rewriting the sequence number and the Ack number contained in the TCP header of a packet to forward to the conversion sequence number and the conversion Ack number corresponding to the expected sequence number and the expected Ack number matching these numbers by referring to the number conversion table at the time of forwarding the packet.

2. The gateway apparatus according to claim 1, wherein the number conversion table includes an entry including a pair of an expected sequence number and a conversion sequence number; and an entry including a pair of an expected Ack number and a conversion Ack number, which are registered for each direction of forwarding the packet, wherein a number rewriting process performed by the conversion unit searches the number conversion table for an entry having the expected sequence number and the expected Ack number having the same forwarding direction as that of the forwarded packet and matching the sequence number and the Ack number of the TCP header of the forwarded packet, and rewrites the sequence number and the Ack number of the TCP header of the forwarded packet to the conversion sequence number and the conversion Ack number written in the found entry.

3. The gateway apparatus according to claim 2, wherein, in addition to the number rewriting process, the conversion unit further performs a number conversion table management process;

wherein the number conversion table management process includes a same forwarding direction entry registration process of registering an entry having the same forwarding direction as that of the forwarded packet and an opposite forwarding direction entry registration process of registering an entry having the opposite forwarding direction to that of the forwarded packet;

wherein the same forwarding direction entry registration process registers in the number conversion table an entry having the expected sequence number which is a sum of the sequence number of the TCP header of the forwarded packet and the application header size before rewriting process of the sequence number and the Ack number and application header rewriting process of the forwarded packet, and having the conversion sequence number which is a sum of the sequence number of the TCP header of the forwarded packet and the application header size after rewriting process of the sequence number and the Ack number and the application header rewriting process; and wherein the opposite forwarding direction entry registration process registers in the number conversion table an entry having the same conversion Ack number as the expected sequence number of the entry registered in the same forwarding direction entry registration process, and having the same expected Ack number as the conversion sequence number of the entry registered in the same forwarding direction entry registration process.

4. The gateway apparatus according to claim 1, further comprising:

a rewriting position management table in which an entry having a pair of the sequence number and the application header rewriting position of the packet is registered for each direction of forwarding the packet;

an application header parse unit performing a rewriting position search process of searching for the rewriting position by analyzing the application header of the forwarded packet, and a rewriting position management table management process of registering the entry containing the rewriting position found in the rewriting position search process in the rewriting position management table; and an application header rewriting unit performing an application header rewriting process of rewriting the application header of the forwarded packet by referring to the rewriting position management table.

5. The gateway apparatus according to claim 4, wherein the application header rewriting position search process is not performed on the packet of the forwarded packet whose entry having the same expected sequence number as the sequence number has already been registered in the number conversion table.

6. The gateway apparatus according to claim 1, wherein, in the number conversion table management process, the conversion unit further performs: an Ack reach packet detection process of confirming an Ack reach packet guaranteeing that the corresponding Ack is delivered from the receiving side to the sending side of the packet; and a number conversion table entry deletion process of deleting an entry having the same forwarding direction as that of the Ack reach packet and having a smaller expected sequence number than the sequence number of the Ack reach packet and an entry having the opposite forwarding direction to that of the Ack reach packet and having a smaller conversion Ack number than the sequence number of the Ack reach packet from the number conversion table.

7. The gateway apparatus according to claim 4, wherein, in the rewriting position management table management process, the application header parse unit further performs: an Ack reach packet detection process of confirming an Ack reach packet guaranteeing that the corresponding Ack is delivered from the receiving side to the sending side; and a rewriting position management table entry deletion process of deleting an entry having the same forwarding direction as that of the Ack reach packet and having a smaller sequence number than the sequence number of the Ack reach packet from the rewriting position management table.

8. The gateway apparatus according to claim 6, wherein the Ack reach packet detection process confirms, as the Ack reach packet, the packet having a smaller sequence number than the value obtained by subtracting a maximum receive Window Size usable on the TCP connection calculated based on a Window Scale option value determined at the TCP connection establishment from the sequence number of the packet last intercepted on the TCP connection.

9. The gateway apparatus according to claim 6, wherein the Ack reach packet detection process confirms, as the Ack reach packet, the packet having a smaller sequence number than the value obtained by subtracting a maximum Window Size reported from the packet received side at the TCP connection after the TCP connection establishment from the sequence number of the packet last intercepted on the TCP connection.

10. The gateway apparatus according to claim 4, further comprising a buffer for storing a forwarded packet, and a packet buffer unit for performing a message start/end position search process of detecting the start and end positions of an application protocol message and notifying the application header parse unit thereof, wherein, when the message start/end position search process detects the end position of the application protocol message in the last stored packet and the application header parse unit completes the analysis of the message, the packet buffer unit erases all the packets except the last stored packet from the buffer.

11. The gateway apparatus according to claim 10, wherein the packet buffer unit does not store, in the buffer, the packet of the forwarded packet whose entry having the same expected sequence number as the sequence number has already been registered in the number conversion table.

12. A packet forwarding method for rewriting and forwarding an application header, namely, data following a TCP header of a packet flowing over a TCP connection between terminals in a gateway apparatus, comprising:

a step in which the gateway apparatus registers, in a number conversion table, a pair of a sequence number which is expected to be contained in the TCP header of a next packet to forward and a sequence number after conversion which is obtained by considering a change in packet size due to application header rewriting as a pair of an expected sequence number and a conversion sequence number as well as a pair of an expected Ack number and a conversion Ack number contained in the TCP header of a packet in a direction opposite to that of the previously forwarded packet at the time of forwarding the packet; and a step in which the gateway apparatus performs number rewriting process of rewriting the sequence number and the Ack number contained in the TCP header of a packet to forward to the conversion sequence number and the conversion Ack number corresponding to the expected sequence number and the expected Ack number matching these numbers by referring to the number conversion table at the time of forwarding the packet.

13. The packet forwarding method according to claim 12, wherein the number conversion table includes an entry including a pair of an expected sequence number and a conversion sequence number; and an entry including a pair of an expected Ack number and a conversion Ack number, which are registered for each direction of forwarding the packet;

the number rewriting process searches the number conversion table for an entry having the expected sequence number and the expected Ack number having the same forwarding direction as that of the forwarded packet and matching the sequence number and the Ack number of the TCP header of the forwarded packet, and rewrites the sequence number and the Ack number of the TCP header of the forwarded packet to the conversion sequence number and the conversion Ack number written in the found entry.

14. The packet forwarding method according to claim 13, wherein the gateway apparatus includes a step of performing a number conversion table management process;

wherein the number conversion table management process includes a same forwarding direction entry registration process of registering an entry having the same forwarding direction as that of the forwarded packet and an opposite forwarding direction entry registration process of registering an entry having the opposite forwarding direction to that of the forwarded packet wherein the same forwarding direction entry registration process registers, in the number conversion table, an entry having the expected sequence number which is a sum of the sequence number of the TCP header of the forwarded packet and the application header size before rewriting process of the sequence number and the Ack number and application header rewriting process of the forwarded packet, and having the conversion sequence number which is a sum of the sequence number of the TCP header of the forwarded packet and the application header size after rewriting process of the sequence number and the Ack number and the application header rewriting process;

wherein the opposite forwarding direction entry registration process registers, in the number conversion table, an entry having the same conversion Ack number as the expected sequence number of the entry registered in the same forwarding direction entry registration process, and having the same expected Ack number as the conversion sequence number of the entry registered in the same forwarding direction entry registration process.

15. The packet forwarding method according to claim 12, wherein the gateway apparatus includes a rewriting position management table in which an entry having a pair of the sequence number and the application header rewriting position of the packet is registered for each direction of forwarding the packet; the method comprising:

a step in which the gateway apparatus performs a rewriting position search process of searching for the rewriting position by analyzing the application header of the forwarded packet, and a rewriting position management table management process of registering the entry containing the rewriting position found in the rewriting position search process in the rewriting position management table; and a step in which the gateway apparatus performs an application header rewriting process of rewriting the application header of the forwarded packet by referring to the rewriting position management table.

16. The packet forwarding method according to claim 15, the gateway apparatus does not perform the application header rewriting position search process on the packet of the forwarded packet whose entry having the same expected sequence number as the sequence number has already been registered in the number conversion table.

17. The packet forwarding method according to claim 12, comprising a step in which the gateway apparatus performs an Ack reach packet detection process of confirming an Ack reach packet guaranteeing that the corresponding Ack is delivered from the receiving side to the sending side of the packet; and a number conversion table entry deletion process of deleting an entry having the same forwarding direction as that of the Ack reach packet and having a smaller expected sequence number than the sequence number of the Ack reach packet and an entry having the opposite forwarding direction to that of the Ack reach packet and having a smaller conversion Ack number than the sequence number of the Ack reach packet from the number conversion table.

18. The packet forwarding method according to claim 15 further comprising a step in which the gateway apparatus performs an Ack reach packet detection process of confirming an Ack reach packet guaranteeing that the corresponding Ack is delivered from the receiving side to the sending side; and a rewriting position management table entry deletion process of deleting an entry having the same forwarding direction as that of the Ack reach packet and having a smaller sequence number than the sequence number of the Ack reach packet from the rewriting position management table.

19. The packet forwarding method according to claim 17, wherein the Ack reach packet detection process confirms, as the Ack reach packet, the packet having a smaller sequence number than the value obtained by subtracting a maximum receive Window Size usable on the TCP connection calculated based on a Window Scale option value determined at the TCP connection establishment from the sequence number of the packet last intercepted on the TCP connection.

20. The packet forwarding method according to claim 17, wherein the Ack reach packet detection process confirms, as the Ack reach packet, the packet having a smaller sequence number than the value obtained by subtracting a maximum Window Size reported from the packet received side at the TCP connection after the TCP connection establishment from the sequence number of the packet last intercepted on the TCP connection.

21. The packet forwarding method according to claim 15, wherein the gateway apparatus comprises a buffer for storing a forwarded packet, the method comprising:

a step in which the gateway apparatus performs a message start/end position search process of detecting the start and end positions of an application protocol message and notifying the application header parse unit thereof; and a step in which when the message start/end position search process detects the end position of the application protocol message in the last stored packet and the application header parse unit completes the analysis of the message, the gateway apparatus erases all the packets except the last stored packet from the buffer.

22. The packet forwarding method according to claim 21, wherein the gateway apparatus does not store, in the buffer, the packet of the forwarded packet whose entry having the same expected sequence number as the sequence number has already been registered in the number conversion table.

23. A non-transitory storage medium for storing a program causing a computer including a gateway apparatus for rewriting and forwarding an application header, namely, data following a TCP header of a packet flowing over a TCP connection between terminals, which includes a number conversion table including an entry for registering a pair of a sequence number which is expected to be contained in the TCP header of a next packet to forward and a sequence number after conversion which is obtained by considering a change in packet size due to application header rewriting as a pair of an expected sequence number and a conversion sequence number as well as a pair of an expected Ack number and a conversion Ack number contained in the TCP header of a packet in a direction opposite to that of the previously forwarded packet at the time of forwarding the packet, to function as a conversion unit for performing number rewriting process of rewriting the sequence number and the Ack number contained in the TCP header of a packet to forward to the conversion sequence number and the conversion Ack number corresponding to the expected sequence number and the expected Ack number matching these numbers by referring to the number conversion table at the time of forwarding the packet.

24. The non-transitory storage medium for storing the program according to claim 23, wherein the number conversion table includes an entry including a pair of an expected sequence number; and
  a conversion sequence number and an entry including a pair of an expected Ack number and a conversion Ack number, which are registered for each direction of forwarding the packet;
  wherein a number rewriting process performed by the conversion unit searches the number conversion table for an entry having the expected sequence number and the expected Ack number having the same forwarding direction as that of the forwarded packet and matching the sequence number and the Ack number of the TCP header of the forwarded packet, and rewrites the sequence number and the Ack number of the TCP header of the forwarded packet to the conversion sequence number and the conversion Ack number written in the found entry.

25. The non-transitory storage medium for storing the program according to claim 24, wherein, in addition to the number rewriting process, the conversion unit further performs a number conversion table management process, wherein the number conversion table management process includes a same forwarding direction entry registration process of registering an entry having the same forwarding direction as that of the forwarded packet and an opposite forwarding direction entry registration process of registering an entry having the opposite forwarding direction to that of the forwarded packet;
  wherein the same forwarding direction entry registration process registers, in the number conversion table, an entry having the expected sequence number which is a sum of the sequence number of the TCP header of the forwarded packet and the application header size before rewriting process of the sequence number and the Ack number and application header rewriting process of the forwarded packet, and having the conversion sequence number which is a sum of the sequence number of the TCP header of the forwarded packet and the application header size after rewriting process of the sequence number and the Ack number and the application header rewriting process;
  wherein the opposite forwarding direction entry registration process registers, in the number conversion table, an entry having the same conversion Ack number as the expected sequence number of the entry registered in the same forwarding direction entry registration process, and having the same expected Ack number as the conversion sequence number of the entry registered in the same forwarding direction entry registration process.

26. The non-transitory storage medium for storing the program according to claim 23 further causing the computer to function as
  an application header parse unit performing a rewriting position search process of searching for the rewriting position by analyzing the application header of the forwarded packet, and a rewriting position management table management process of registering the entry containing the rewriting position found in the rewriting position search process in a rewriting position management table in which an entry having a pair of the sequence number and the application header rewriting position of the packet is registered for each direction of forwarding the packet; and
  an application header rewriting unit performing an application header rewriting process of rewriting the application header of the forwarded packet by referring to the rewriting position management table.

27. The non-transitory storage medium for storing the program according to claim 26, wherein the application header rewriting position search process is not performed on the packet of the forwarded packet whose entry having the same expected sequence number as the sequence number has already been registered in the number conversion table.

28. The non-transitory storage medium for storing the program according to claim 23, wherein, in the number conversion table management process, the conversion unit further performs:
  an Ack reach packet detection process of confirming an Ack reach packet guaranteeing that the corresponding Ack is delivered from the receiving side to the sending side of the packet; and
  a number conversion table entry deletion process of deleting an entry having the same forwarding direction as that of the Ack reach packet and having a smaller expected sequence number than the sequence number of the Ack reach packet and an entry having the opposite forwarding direction to that of the Ack reach packet and having a smaller conversion Ack number than the sequence number of the Ack reach packet from the number conversion table.

29. The non-transitory storage medium for storing the program according to claim 26, wherein, in the rewriting position management table management process, the application header parse unit further performs: an Ack reach packet detection process of confirming an Ack reach packet guaranteeing that the corresponding Ack is delivered from the receiving side to the sending side; and
  a rewriting position management table entry deletion process of deleting an entry having the same forwarding direction as that of the Ack reach packet and having a smaller sequence number than the sequence number of the Ack reach packet from the rewriting position management table.

30. The non-transitory storage medium for storing the program according to claim 28, wherein the Ack reach packet detection process confirms, as the Ack reach packet, the packet having a smaller sequence number than the value obtained by subtracting a maximum receive Window Size usable on the TCP connection calculated based on a Window Scale option value determined at the TCP connection establishment from the sequence number of the packet last intercepted on the TCP connection.

31. The non-transitory storage medium for storing the program according to claim 28, wherein the Ack reach packet detection process confirms, as the Ack reach packet, the packet having a smaller sequence number than the value obtained by subtracting a maximum Window Size reported from the packet received side at the TCP connection after the TCP connection establishment from the sequence number of the packet last intercepted on the TCP connection.

32. The non-transitory storage medium for storing the program according to claim 26 further causing the computer to function as
  a packet buffer unit for storing a forwarded packet in a buffer;
  performing a message start/end position search process of detecting the start and end positions of an application protocol message and notifying the application header parse unit thereof; and
  erasing all the packets except the last stored packet from the buffer when the message start/end position search process detects the end position of the application protocol message in the last stored packet and the application header parse unit completes the analysis of the message.

33. The non-transitory storage medium for storing the program according to claim 32, wherein the packet buffer unit does not store, in the buffer, the packet of the forwarded packet whose entry having the same expected sequence number as the sequence number has already been registered in the number conversion table.

* * * * *